United States Patent
Adams et al.

(10) Patent No.: US 10,551,714 B2
(45) Date of Patent: Feb. 4, 2020

(54) OPTICAL DEVICE

(71) Applicant: Finisar Sweden AB, Järfälla (SE)

(72) Inventors: David Adams, Stockholm (SE);
Efthymios Rouvalis, Berlin (DE);
Jan-Olof Wesström, Stockholm (SE);
Martin Zirngibl, Middletown, NJ (US);
Robert Lewén, Tyresö (SE);
Christopher Daunt, Solna (SE)

(73) Assignee: Finisar Sweden AB, Jarfalla (SE)

( * ) Notice: Subject to any disclaimer, the term of this patent is extended or adjusted under 35 U.S.C. 154(b) by 0 days.

(21) Appl. No.: 15/980,707

(22) Filed: May 15, 2018

(65) Prior Publication Data

US 2018/0335681 A1 Nov. 22, 2018

Related U.S. Application Data

(60) Provisional application No. 62/507,284, filed on May 17, 2017.

(51) Int. Cl.
| | |
|---|---|
| *G02F 1/225* | (2006.01) |
| *H04B 10/079* | (2013.01) |
| *G02F 1/21* | (2006.01) |

(52) U.S. Cl.
CPC ......... *G02F 1/225* (2013.01); *H04B 10/0795* (2013.01); *G02F 2001/212* (2013.01); *G02F 2001/217* (2013.01)

(58) Field of Classification Search
CPC .............. G02F 1/225; G02F 2001/212; G02F 2001/217; H04B 10/0795; H04B 10/5053

(Continued)

(56) References Cited

U.S. PATENT DOCUMENTS

| | | | |
|---|---|---|---|
| 9,618,821 B2 | 4/2017 | Jewart et al. | |
| 2008/0112710 A1* | 5/2008 | Tanaka | G02F 1/0123 398/188 |

(Continued)

FOREIGN PATENT DOCUMENTS

| | | |
|---|---|---|
| WO | 2012/093267 A1 | 7/2012 |
| WO | 2016/152128 A1 | 9/2016 |

OTHER PUBLICATIONS

International Search Report and Written Opinion, as issued in connection with International Patent Application No. PCTEP2018062955, dated Aug. 29, 2018, 16 pgs.

(Continued)

*Primary Examiner* — Jerry M Blevins
(74) *Attorney, Agent, or Firm* — Maschoff Brennan; Paul G. Johnson

(57) ABSTRACT

An optical interference modulator comprises a main input, a main output, an optical splitter connected to the main input, first and second MMI couplers, each with a first primary-end access port connected to the splitter; a second primary-end access port connected to the main output; a first secondary-end access port connected to a respective primary waveguide; and a second secondary-end access port connected to a respective secondary waveguide. A light reflector is arranged to reflect light incident from said primary and secondary waveguides back into the same respective waveguide such that light travelling through the respective waveguide from the respective secondary-end access port, after reflection, travels back to the same secondary-end access port. For the MMI couplers, at least one of the respective primary and secondary waveguides comprises a respective light phase modulating device arranged to modulate the phase of light travelling along the corresponding waveguide in either direction.

26 Claims, 10 Drawing Sheets

(58) Field of Classification Search
USPC .............................................................. 385/3
See application file for complete search history.

(56) References Cited

U.S. PATENT DOCUMENTS

| | | | |
|---|---|---|---|
| 2009/0238510 A1* | 9/2009 | Kawanishi | G02F 1/0327 385/2 |
| 2015/0063742 A1* | 3/2015 | Wesstrom | G02F 1/225 385/3 |
| 2015/0086158 A1* | 3/2015 | Kojima | G02B 6/12007 385/28 |
| 2016/0170286 A1* | 6/2016 | le Liepvre | G02B 6/12016 385/2 |
| 2017/0045688 A1* | 2/2017 | Doi | G02B 6/2773 |

OTHER PUBLICATIONS

Jeong et al., "Compact optical 90° hybrid employing a tapered 2×4 MMI coupler serially connected by a 2×2 MMI coupler", Optics Express, vol. 18, No. 5, Mar. 1, 2010, pp. 4275-4288.

Kurumida et al., "Nonlinear Optical Signal Processing in Optical Packet Switching Systems", IEEE Journal of Selected Topics in Quantum Electronics, vol. 18, No. 2, Mar./Apr. 2012, pp. 978-987.

\* cited by examiner

OPTICAL DEVICE

CROSS-REFERENCE TO RELATED APPLICATION

This application claims the benefit of and priority to U.S. Provisional Application No. 62/507,284 filed May 17, 2017. The 62/507,284 application is incorporated herein by reference.

FIELD

The embodiments herein relate to an optical device, in particular to an optical modulator. The embodiments herein also relate to a method for modulating an optical signal and a method for monitoring a modulated optical signal.

BACKGROUND

Optical modulators are known in the art. In many applications, in particular for high speed optical communication systems, a modulated light wave is used to carry digital information from a sender to a receiver. In many such systems, the modulation may be phase and/or amplitude modulation. Examples include binary amplitude modulation with a return-to-zero (RZ) or non-return-to-zero (NRZ) optical pulse stream format, and phase shift keying modulation techniques, such as Binary Phase Shift Keying (BPSK) and Quadrature Phase Shift Keying (QPSK), and Quadrature Amplitude Modulation (QAM) techniques, such as QAM8, QAM16 and QAM64. In each of these communication formats, the modulated light wave will carry information about one or several symbols selected among a predetermined set of symbols.

In order to achieve such modulation of a carrier light wave, it is known to split the carrier light wave using a splitter, and to recombine the carrier light wave in a combiner after a relative phase shift of the different light paths between the splitter and combiner, forming a Mach-Zehnder interferometer. The phase shift can for instance be achieved using electrodes attached to one or more of said paths, to each of which electrodes a variable electric signal can be applied so that the refractive index of the path waveguide material changes. Such variable phase shift can be combined with a predetermined fixed phase shift for each waveguide. This way, each symbol can be modulated as a unique combination of total phase shifts along each path.

Some modulators can comprise a plurality of so-called "child" interference modulators that are arranged in parallel, and that are comprised within a larger "parent" interference modulator. A modulator in which a first parallel-coupled MZM controls the imaginary part of the electromagnetic field (Q value) and a second parallel-coupled MZM controls the corresponding real part (I value) is called an IQ modulator (IQM).

WO 2011022308 A2 discloses using a Mach-Zehnder modulator (MZM), yielding two paths, or two parallel-coupled child MZMs each on one respective path of a parent MZM, yielding in total four paths, with variable-voltage electrodes on each path, for such modulation.

A problem with such interferometric light wave phase modulators is that these modulators are typically very large when compared with the wavelength of the light in the optical waveguides. This is attributable not only to the typically weak refractive index modulation response of the waveguide material in response to applied voltage, but also to the additional device length that is required to accommodate the optical splitters and combiners and their input and output access waveguides. The relatively large device dimensions have an impact on the cost of the modulator device itself, and the chip size will also impact the size and cost of the modulator submount and of the optical module package enclosure.

Another problem associated with the typically weak refractive index response of the waveguide material to reverse voltage bias is that either lengthy phase modulation electrodes are required, and/or high modulation voltage swings are required, to attain a desired dynamic phase modulation amplitude or intensity extinction ratio under device operation. A problem with lengthy electrodes on the phase modulator arms is that these contribute a parasitic capacitance that limits the maximum achievable modulation bandwidth of the modulator. The use of travelling wave electrodes partly mitigates the bandwidth limitation that is imposed by the capacitance on the arms, but these travelling wave electrodes are typically longer, and they are more complex to manufacture, than the basic "lumped" electrical circuit element phase modulation electrodes.

An additional problem with the use of large amplitude dynamic voltage swings is that the electrical power dissipation is approximately proportional to the square of the modulation voltage swing amplitude, so that a large voltage swing will contribute substantially to the energy cost of the operation of the communication system.

BRIEF SUMMARY OF SOME EXAMPLE EMBODIMENTS

Some embodiments herein may solve one or more of the above described problems.

Hence, an example embodiment relates to an optical interference modulator, comprising a main input for light to be modulated, a main output for modulated light, an optical splitter connected to the main input, respective first and second MMI (MultiMode Interference) couplers, each with a respective first primary-end access port connected to the splitter; a respective second primary-end access port connected to the main output; a respective first secondary-end access port connected to a respective primary waveguide; and a respective second secondary-end access port connected to a respective secondary waveguide, wherein the modulator further comprises a light reflector arranged to reflect light incident from said primary and secondary waveguides back into the same respective waveguide, so that light travelling through the waveguide in question from said respective first or second MMI coupler secondary-end access port will, after reflection, travel back to the same first or second MMI secondary-end access port, wherein, for both the first and second MMI couplers, at least one of the said respective primary and secondary waveguides comprises a respective light phase modulating device arranged to modulate the phase of light travelling along the waveguide in question in both directions; and wherein both the first and second MMI couplers are arranged so that a different respective phase shift is imparted to light travelling between a primary-end access port and a secondary-end access port in a cross state as compared to in a bar state.

Furthermore, an example embodiment relates to a method for modulating an optical signal using an optical interference modulator, which optical interference modulator comprises a main input for light to be modulated, a main output for modulated light, an optical splitter connected to the main input, respective first and second MMI (MultiMode Interference) couplers, each with a respective first primary-end access port connected to the splitter; a respective second primary-end access port connected to the main output; a respective first secondary-end access port connected to a respective primary waveguide; and a respective second secondary-end access port connected to a respective secondary waveguide, wherein the modulator further comprises a light reflector arranged to reflect light incident from said primary and secondary waveguides back into the same respective waveguide, so that light travelling through the waveguide in question from said respective first or second MMI coupler secondary-end access port will, after reflection, travel back to the same first or second MMI secondary-end access port, wherein, for both the first and second MMI couplers, at least one of the said respective primary and secondary waveguides comprises a respective light phase modulating device arranged to modulate the phase of light travelling along the waveguide in question in both directions; and wherein both the first and second MMI couplers are arranged so that a different respective phase shift is imparted to light travelling between a primary-end access port and a secondary-end access port in a cross state as compared to in a bar state, which method comprises the steps of a) selecting a modulation scheme covering at least two different modulation symbols; b) for the said light phase modulating device along the said primary and secondary waveguides, selecting respective fixed light phase shifts so that destructive interference results for each of said modulated symbols, and c) modulating the said symbols by selecting different variable light phase shifts for said light phase modulating device along the said primary and secondary waveguides.

Also, an example embodiment relates to a method for monitoring a modulated optical signal using an optical interference modulator, which optical interference modulator comprises a main input for light to be modulated, a main output for modulated light, an optical splitter connected to the main input, respective first and second optical couplers, each with a respective first primary-end access port connected to the splitter; a respective second primary-end access port connected to the main output; a respective first secondary-end access port connected to a respective primary waveguide; and a respective second secondary-end access port connected to a respective secondary waveguide, wherein the modulator further comprises a light reflector arranged to reflect light incident from said primary and secondary waveguides back into the same respective waveguide, so that light travelling through the waveguide in question from said respective first or second coupler secondary-end access port will, after reflection, travel back to the same first or second secondary-end access port, wherein, for both the first and second couplers, at least one of the said respective primary and secondary waveguides comprises a respective light phase modulating dew vice arranged to modulate the phase of light travelling along the waveguide in question in both directions; wherein reflected light exiting from a particular primary-end MMI coupler access port is conveyed, via a waveguide, to a second output, and which method comprises the steps of a) providing a light detector, arranged to detect said light conveyed to said second output; b) the light detector detecting an amplitude and/or a phase of the detected light and reporting the measurement value to a control unit performing the monitoring.

BRIEF DESCRIPTION OF THE DRAWINGS

In the following, the invention will be described in detail, with reference to exemplifying embodiments of the invention and to the enclosed drawings, wherein:

FIGS. 2b and 2c are enlarged detail views of respective MMI couplers of FIG. 2a;

FIG. 3 illustrates an unfolded representation of the folded modulating device shown in FIG. 2a;

FIG. 5b illustrates a phasor diagram that represents the light signal that is reflected back to the laser for the modulator in FIG. 5a;

All Figures are simplified, overview illustrations provided for understanding of the principles proposed by the present inventors, and are in general not to scale.

DETAILED DESCRIPTION OF SOME EXAMPLE EMBODIMENTS

Using optical communication technology, it is possible to send information using both amplitude and phase modulation schemes. One of the advantages of this, as compared to only using amplitude modulation, is that more information can be sent over the same optical frequency band.

Figure 1A:
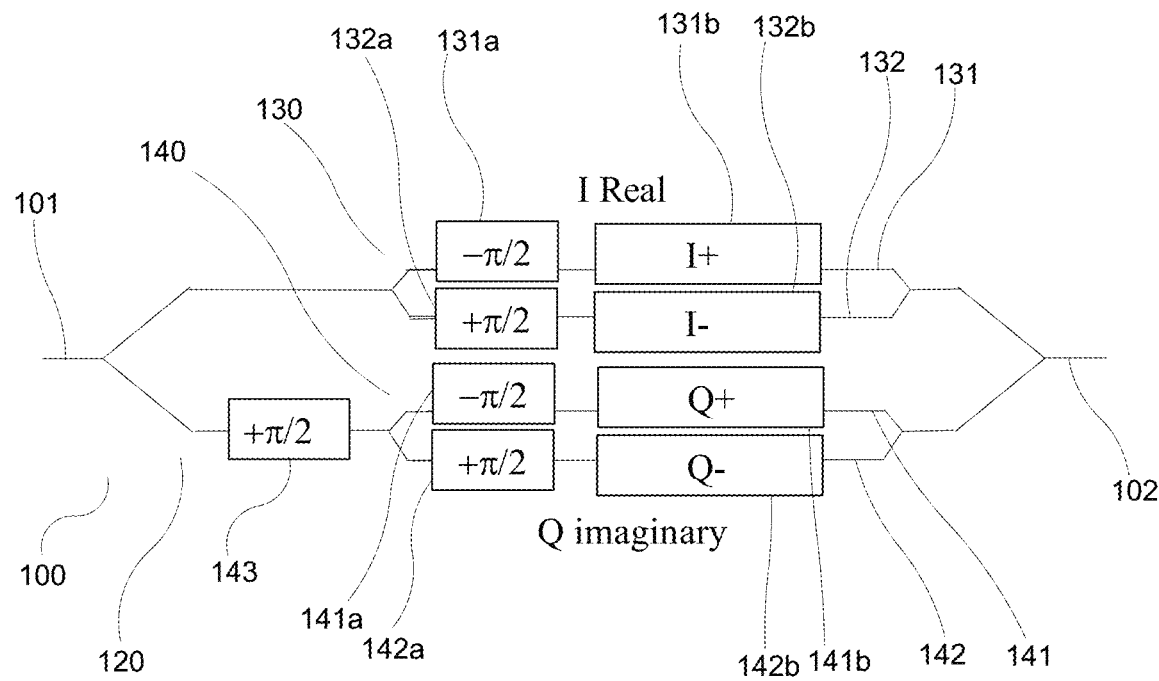
FIGS. 1a, 1b, 1c and 1d illustrate a conventional modulating device, with corresponding phasor and constellation diagrams.

One type of device that can transmit phase and amplitude modulated signals is an IQ modulator (IQM), consisting of a parallel pair of child Mach-Zehnder interferometers disposed along each arm of a parent Mach-Zehnder interferometer. An example of a conventional modulator 100 of this type is illustrated in FIG. 1a.

The modulator 100 comprises a main or parent Mach-Zehnder Interferometer (MZI) 120 with a main input waveguide 101 and a main output waveguide 102. The respective paths of the main MZI 120 comprise one respective child MZI 130, 140 each. The child MZIs 130, 140 are parallel-coupled, where a first child MZI 130 comprises first 131 and second 132 paths of the modulator 100 and a second child MZI 140 comprises third 141 and fourth 142 paths of the modulator 100.

Figure 1B:
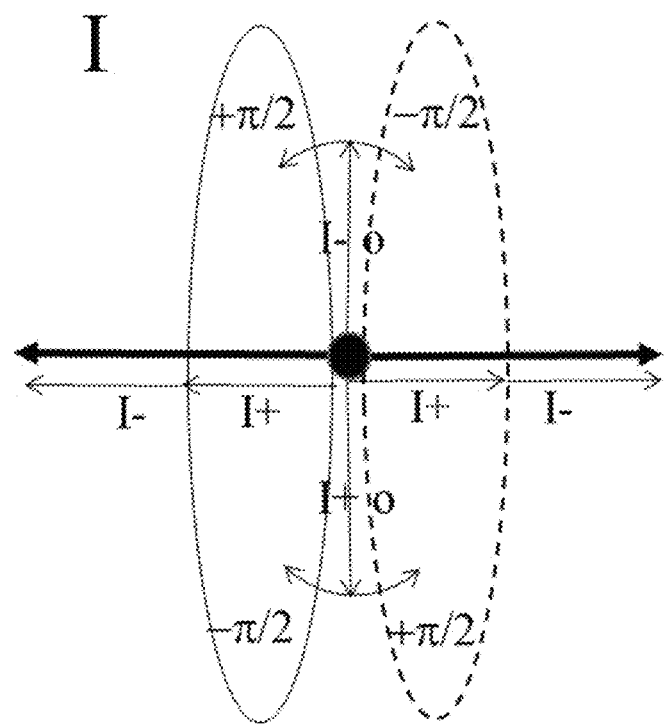
Figure 1C:
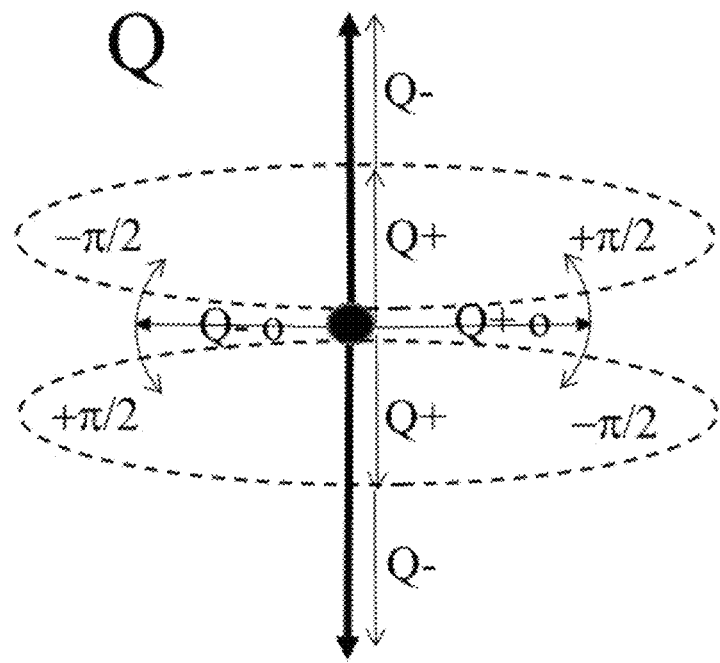
Figure 1D:
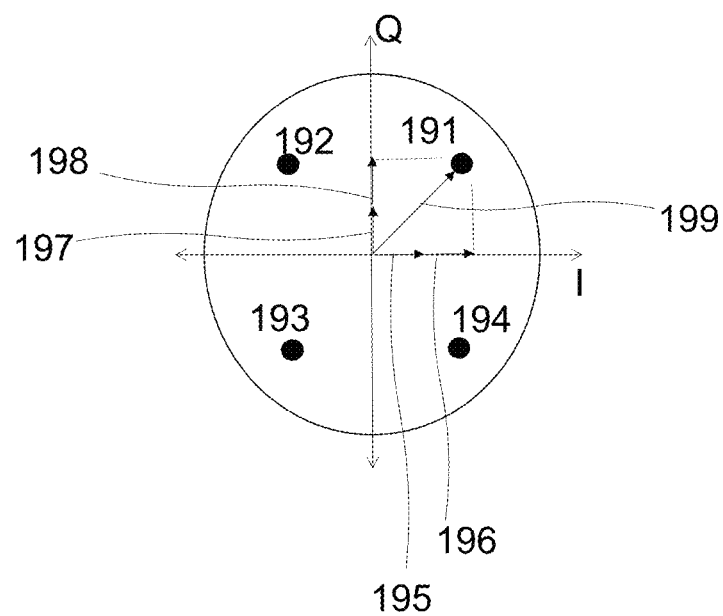

One example of a conventional advanced modulation format that can be impressed onto an optical carrier wave by such an IQ modulator is the Quadrature Phase Shift Keying (QPSK) scheme, involving four distinct symbols 191, 192, 193, 194 as shown in FIG. 1d in a phasor diagram of conventional type. The circle in FIG. 1d illustrates the unity amplitude transmission.

In QPSK modulation, the four symbols 191-194 differ in both the real part (the I-axis) and the imaginary part (the Q-axis) of the complex E-field, as illustrated in FIG. 1d. FIGS. 1b and 1c illustrate the I+, I−, and Q+, Q− arm phasor positions in the absence of applied modulation voltage (labelled Io+, Io−, and Qo+, Qo−) and their direction of rotation in push pull modulation, with the sum net positive or negative I and Q vector amplitudes along the real and imaginary output field axes.

The convention used herein for the construction and interpretation of phasor diagrams, is that the propagation of light corresponds to counter-clockwise movement of a phasor (positive angular rotation). Furthermore, for the sake of consistency, it is assumed that all launched optical beams begin with a phase of zero where these encounter the first element that can affect the relative phase of one optical path vs. one or more other paths. Phase delays correspond to negative (clockwise) phasor rotation.

It is understood that there may be several, different sets of individual static phase shifts that result in a certain desired net interference performance at a data output port, and that also provide a desired net interference performance for any light reflected back to a port that delivers light to the modulator from a light source, as will be detailed below.

For reasons of simplicity, optical losses due to device fabrication imperfections or the partial absorption of light signals caused by the modulator material in response to applied voltage or current tuning are neglected in the following description. Symmetric splitting and combining will be assumed at all the splitters and couplers in all of the diagrams. Even though such symmetric splitting and combining is preferred, the embodiments disclosed herein could also comprise asymmetric splitting and/or combining for one or several of the described splitters and combiners.

Hence, for the IQ modulator 100 illustrated in FIG. 1a, the second child MZI 140 is associated with an initial static phase shift 143 of +π/2 radians, which is applied before the light enters the child MZI 140 in question, but not to light travelling to the first child MZI 130. With such a setup, the first child MZI 130 will be effective for modulating the real part of the E-field (I-axis in the phasor diagram of FIG. 1d), and the second child MZI 140 will be effective for modulating the imaginary part of the E-field (Q-axis in FIG. 1d). By applying respective electrical signals onto electrodes 131b, 132b; 141b, 142b, arranged along respective parallel arms 131, 132, 141, 142 of the child MZI:s 130, 140, in a push-pull fashion, an I-data stream represented in the modulated light wave output on waveguide 102, by the electrical signal applied over time onto electrodes 131b, 132b of the child MZI 130 can be represented as variations of the real part of the E-field of the modulated light wave, and correspondingly a Q-data stream represented by the electrical signal applied over time onto electrodes 141b, 142b of the child MZI 140 can be represented in the modulated light wave output on waveguide 102 as variations of the corresponding imaginary part of the E-field. In QPSK, this can be done in a straightforward way by sending, in the form of corresponding electrical signals, the I-data stream to the I-child 130 and the Q-data stream to the Q-child 140.

The result is illustrated in FIG. 1d, where the vectors 195, 196, 197, 198 correspond to the light that that has travelled through paths I+, I−, Q+ and Q−, respectively, and for a certain symbol where I+=1, I−=−1, Q+=1 and Q−=−1, so that the variable phase modulation applied by the respective electrodes 131b, 132b, 141b, 142b is +π/2, −π/2, +π/2 and −π/2, respectively. Hence, the total phase shift, including the static modulation, for each path is according to Table I for this particular symbol:

TABLE I

| Vector | Data | Total phase shift |
|---|---|---|
| 195 | I+ = 1 | $(-\frac{\pi}{2}) + \frac{\pi}{2} = 0$ |
| 196 | I− = −1 | $\frac{\pi}{2} + (-\frac{\pi}{2}) = 0$ |
| 197 | Q+ = 1 | $\frac{\pi}{2} + (-\frac{\pi}{2}) + \frac{\pi}{2} = \frac{\pi}{2}$ |
| 198 | Q− = −1 | $\frac{\pi}{2} + \frac{\pi}{2} + (-\frac{\pi}{2}) = \frac{\pi}{2}$ |

The resulting vector 199 represents the output light wave output on waveguide 102 after final combination of the light waves output by the two child MZIs 130, 140.

The modulation according to the invention generally takes place in a corresponding fashion, with differences that will become clear from the following.

Figure 2A:
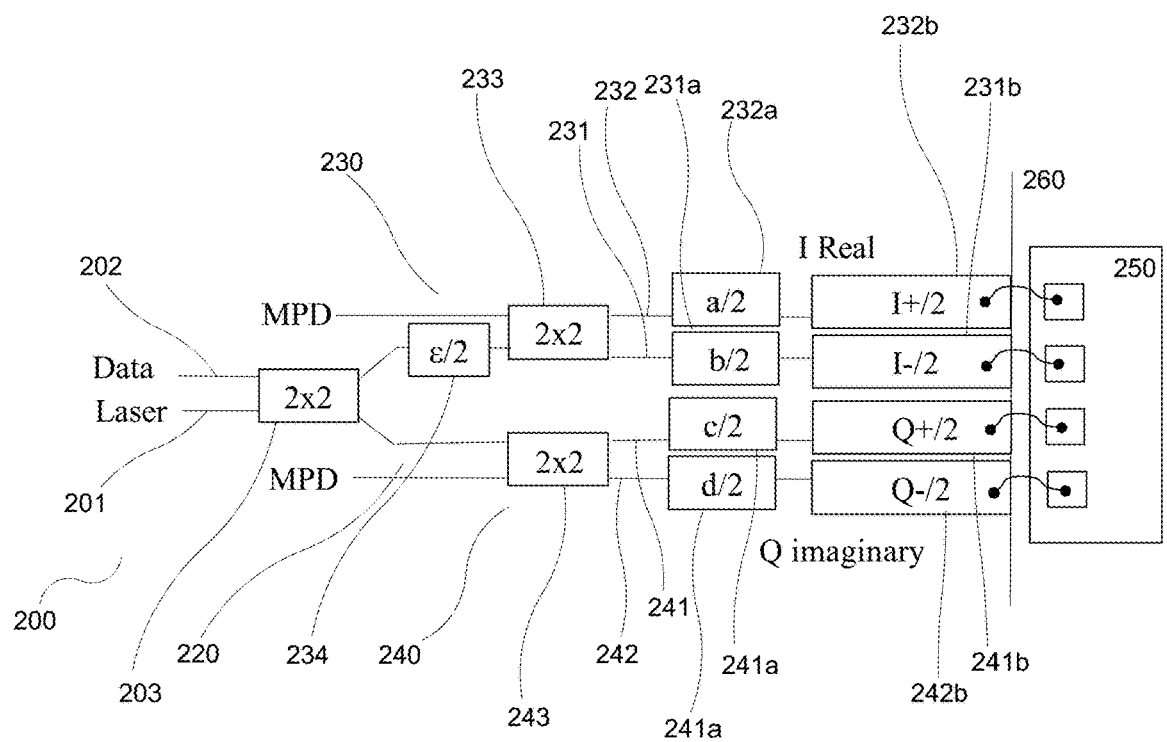
FIG. 2a shows a modulating device.

FIG. 2a illustrates an optical interference modulator 200. The optical interference modulator 200 uses a reflective IQ modulator geometry that can impress QPSK modulation onto an optical carrier wave in a manner that is equivalent to that achieved with a conventional IQM modulator, such as the one illustrated in FIG. 1a.

Figure 2B:
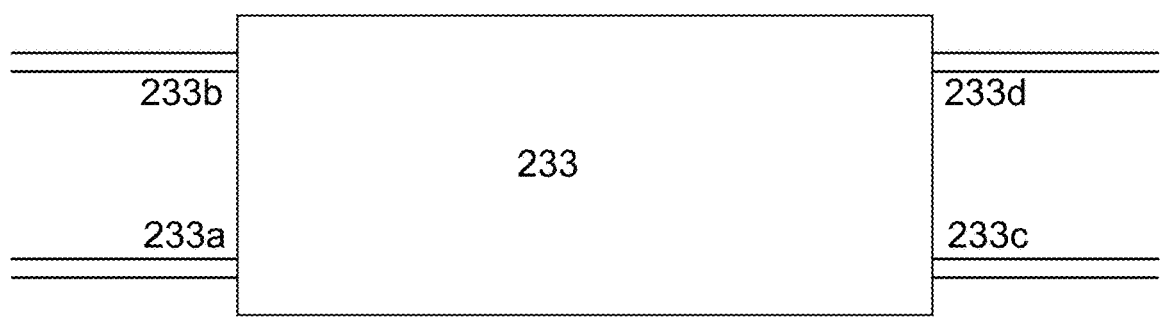
Figure 2C:
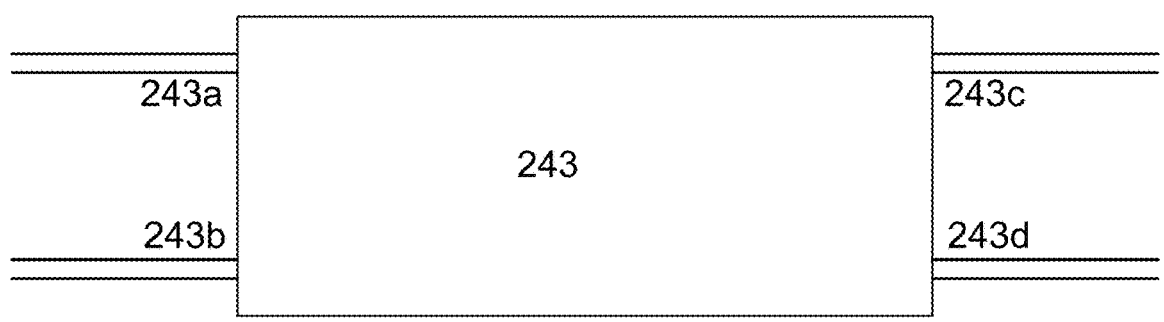

The optical interference modulator 200 comprises a main input 201 for light to be modulated, a main output 202 for modulated light (a data output port), an optical splitter 203 in the form of a 2×2 MMI (MultiMode Interference) coupler connected to the main input 201, and connecting, via waveguides, the output ports of the splitter 203 (the MMI outputs) to respective first 233 and second 243 MMI (MultiMode Interference) couplers. In general, in the terminology used herein, such an MMI coupler comprises two primary-side access ports and two secondary-side access ports. As illustrated in FIG. 2b, the first MMI coupler 233 comprises primary-side access ports 233a, 233b and secondary-side access ports 233c, 233d. As illustrated in FIG. 2c, the second MMI coupler 243 comprises primary-side access ports 243a, 243b and secondary-side access ports 243c, 243d. The term "primary-side" refers to a side of the MMI in question facing towards the main input 201 and/or output 202, and/or away from a light reflector 260 as described below; the term "secondary-side" refers to a side of the MMI in question facing away from the main input 201 and/or output 202, and/or towards such a light reflector 260. It is realized that such an MMI coupler may have more than two primary-side access ports, and more than two secondary-side access ports.

In the case illustrated in FIG. 2a-2c, each of said MMI couplers 233, 243 comprises a respective first primary-end access port 233a; 243a connected to the said splitter 203. Furthermore, each of said MMI couplers 233, 243 comprises a respective second primary-end access port 233b; 243b that are not connected to the main output 202, but to an "MPD" ("Monitor Photo Diode") port, used for monitoring (see below). The respective first primary-side access ports 233a, 243a deliver light that has been reflected at 260 (see below) to the splitter 203, whereby such reflected light is combined in the splitter 203 and delivered on a second primary-side access port of the splitter 203, which in turn is connected to the main output 202. A corresponding first primary-side access port of the splitter 203 is connected to the main input 201 and the laser. It is realized that "connected to", in this context, may refer to a direct or indirect optical connection, where an indirect optical connection could for example be an optical path through a lens train or a surface grating coupler.

Moreover, each of said MMI couplers 233, 243 comprises a respective first secondary-end access port 233c; 243c connected to a respective primary waveguide 231; 241, and a respective second secondary-end access port 233d; 243d connected to a respective secondary waveguide 232; 242. Hence, the primary 231 and secondary 232 waveguides connected to the first MMI coupler 233 may form the parallel-connected waveguides of a first child MZI 230 as described above in connection to FIG. 1a, while the primary 241 and secondary 242 waveguides connected to the second MMI coupler 243 may form the parallel-connected waveguides of a second child MZI 240 in the corresponding manner. In this context, the first 230 and second 240 MZI:s may be arranged in a respective parallel-connected arm of a parent MZI 220 comprised in the modulator 200.

The modulator 200 further comprises a light reflector 260 arranged to reflect light incident from said primary 231, 241 and secondary 232, 242 waveguides back into the same respective waveguide, so that light travelling through the waveguide in question from said respective first 233 or second 243 MMI coupler secondary-end access port 233c, 233d; 243c, 243d will, after reflection, travel back to the same first or second MMI secondary-end access port. In other words, instead of the child MZI:s 230, 240 having a respective separate combiner, the respective MMI coupler 233, 243, acting as the splitter in the child MZI 230, 240 in question, also acts as combiner in the child MZI in question, after the light has been reflected at the light reflector 260.

Furthermore, for both the first 233 and second 243 MMI couplers, at least one of the said respective primary 231, 241 and secondary 232, 242 waveguides comprises a respective light phase modulating means 231a, 232a, 241a, 242a, 231b, 232b, 241b, 242b, arranged to modulate the phase of light travelling along the waveguide 231, 232, 241, 242 in question in either direction (both directions). In particular, it is preferred that at least one of said primary 231, 242 or secondary 232; 242 waveguides of both the first 230 and second 240 child MZI:s comprises such a respective light phase modulating means. Preferably, the light phase modulating means referred to herein is at least a variable (dynamic, controllable) light phase modulating means 231b, 232b, 241b, 242b, which may impart different light phase modulating magnitudes as a response to an electric signal applied to the light phase modulating means in question.

Furthermore, both the first 233 and second 243 MMI couplers are arranged so that a different respective phase shift is imparted to light travelling between a primary-end access port 233a, 233b; 243a, 243b and a secondary-end access port 233c, 233d; 243c, 243d in a cross state as compared to in a bar state. It is realized that examples of "cross state" light paths comprise 233a→233d and 233b→233c; while examples of "bar state" light paths comprise 233a→233c and 233b→233d. Such difference between a cross state and a bar state transmission is equally true regarding all 2×2 MMI couplers disclosed herein. For other types of MMIs, such as an N×M MMI, where N,M>1 and at least one of N,M>2, corresponding light path differences may exist as between said cross and bar states (but in general having different light path length differences than in a 2×2 MMI, depending on entry/exit port combination), and may be used in a corresponding way as described herein for the special case N=M=2.

In particular, it is preferred that the first 233 and second 243 MMI couplers are arranged to impart a relative phase shift of $\pi/2$ radians between cross state transmitted light passing the MMI coupler 233, 243 in question and bar state light passing the MMI coupler 233, 243 in question, respectively.

Due to its folded geometry, such an optical modulator device 200 in general has more compact device dimensions as compared to a non-folded device, and can simultaneously, due to the use of MMI couplers 233, 243 with different phase shifts between cross and bar states, be designed to achieve very low optical reflections back to the optical input port 201 of the modulator 200. Moreover, it is possible to achieve a reduction in the required modulation voltage swing when compared with the prior art, as well as an increase in the modulation bandwidth when compared with prior art modulators.

Furthermore, the folded geometry of the modulator 200 enables a reduction in the length of phase modulation arms.

The phase shifting means 231a, 232a, 241a, 242a are preferably static or fixed, while phase shifting means 231b, 232b, 241b, 242b are dynamic or variable. Herein, "static" or "fixed" phase shifting means may be controllable so as to reach a particular calibration or configuration of the modulator 200, but their imparted phase shifts are generally not changed with each modulated symbol. In contrast thereto, a "dynamic" or "variable" phase shifting means is arranged to impart a phase shift which is different for different modulated symbols. Preferably, each child MZ 230 240 arm 131, 132, 141, 142 comprises at least a respective variable phase shifting means 131b, 132b, 141b, 142b, and preferably at least one or two, preferably all four, of the arms 131, 132, 141, 142 also comprise a respective fixed phase shifting means 131a, 132a, 141a, 142a.

The double pass of the optical carrier wave through any static phase modulation means 231a, 232a, 241a, 242a leads to a reduction in the required length or of the required applied current or voltage bias for the desired static fixed phase modulation in question, when compared with a non-folded modulator layout. The corresponding is also true regarding the variable phase shift means 231b 232b, 241b, 242b.

Moreover, the size of the modulator 200 can also be reduced for a folded geometry, when compared with a conventional modulator layout, not only because of a possible reduction in the static or dynamic phase electrode lengths, but also because of the double pass through the said optical coupler elements 233, 243, which serve as splitters in the initial pass and later serve as combiners when the light is returning through the modulator 200 after the reflection from the interferometer arm terminations.

In the following, several different detailed ways of achieving these and other advantages will be presented, in combination with a number of exemplifying embodiments of the present invention.

According to a preferred embodiment, for each MMI coupler 233, 243, at least one of said respective primary 231; 241 and secondary 232; 242 waveguides comprises a respective fixed phase shift means 231a, 232a, 241a, 242a. Preferably, such fixed phase shift means 231a, 232a, 241a, 242a are used in combination with said variable phase shift means 231b, 232b, 241b, 242b along the same respective waveguide 231, 232, 241, 242. Then, the combination of fixed phase shift means 231a, 232a, 241a, 242a is selected, in particular preferably together with a particular selected variable phase shift means 231b, 232b, 241b, 242b control program, so that a desired interference pattern results between light exiting the respective first primary-end access ports 233a; 243a of each MMI coupler 233, 243, being combined in the said splitter 203 and delivered back to the main input 201 and the laser. Such desired destructive interference pattern may be specifically accomplished by such selection of fixed phase shifts when the said variable phase modulating means 231b, 232b, 241b, 242b are controlled and set so as to modulate the light output through the main output waveguide 202 according to at least two different predetermined modulation symbols.

Such fixed phase shifts may be selected, in relation to a used variable phase shift modulating program, in different ways. A number of examples will be provided in the following.

Specifically, one of the child MZI:s 230, 240, such as the first child MZI 230, may be associated with an initial static phase shift 234, such as of $+\pi/2$ radians, which is applied before the light enters the child MZI 130 in question but not to light travelling to the other child MZI 140.

In general, the variable phase shifts of the variable phase shifting means 231b, 232b, 241b, 242b are controlled by a control device 250, which may in turn be controlled using a control unit (not shown in the Figures).

Preferably, and as described above, the modulator 200 is a Mach-Zehnder modulator, wherein each of the said first 233 and second 243 MMI couplers are arranged to split light incident from the main input 201 into different respective waveguides 231, 232; 241, 242, and also to combine reflected light incident from such different waveguides.

In particular, it is preferred that the first MMI coupler 233 forms both the splitter and combiner of a first optical interferometer 230 arranged to control the real part of the electromagnetic field of the light to be modulated, and that the second MMI coupler 243 forms both the splitter and combiner of a second optical interferometer 240 arranged to control the imaginary part of the electromagnetic field of the light to be modulated.

According to a preferred embodiment, the light reflector 260 is a cleaved facet of an integrated optical chip comprising the first 233 and second 243 MMI couplers, provided with a high reflectivity coating. Alternatively, the arms 231, 232, 241, 242 may terminate with a grating reflector or a TIR type reflector, or comprise an etched, non-cleaved facet that is then coated with a high reflectivity coating.

Hence, in FIG. 2a, the four interferometer arms 231, 232, 241, 242 each terminate at such a facet 260, preferably having a high reflectivity coating applied to said facet, such that incident optical beams are retro-reflected at this facet 260, and thereby traverse the phase modulation 231, 232, 241, 242 arms a second time, in the opposite direction. Alternatively, other reflective elements 260, such as gratings, can be utilized to achieve the retro-reflection at the termination of the interferometer arms 231, 232, 241, 242.

Further with reference to FIG. 2a, the Y junction splitter elements of FIG. 1a have been replaced by respective 2×2 port optical MMI couplers 233, 234, and this also applies to the splitter 203, which is preferably also an MMI coupler, preferably a 2×2 MMI coupler. The first 2×2 MMI coupler 203 after the laser, which laser delivers light to the main input waveguide 201, serves to split the light into the two child Mach-Zehnders 230, 240 for the forward pass through the arms 231, 232, 241 242, and this 2×2 MMI coupler 203 also serves to combine the reflected beams from the two child Mach-Zehnders 230, 240 into the data output port 202 after the return pass. Likewise, the 2×2 MMI couplers 233, 243 at the start of each child Mach-Zehnder 230, 240 serve to split the input beam into the respective interferometer arms 231, 232, 241, 242, and also to recombine these beams after the return pass through the interferometer arms 231, 232, 241, 242. Preferably, the 2×2 MMI couplers 233, 243 at the start of each child Mach-Zehnders 230, 240 may comprise one port (namely, the respective second primary-side access port 233b, 243b), arranged to direct light into an integrated or external monitor photodiode (MPD—see FIG. 2a). This enables, via a feedback mechanism based upon readings of such an MPD and performed by a control unit of the above mentioned type, accurate device configuration for transmission, and/or to maintain a proper device configuration over its operational lifetime. Optionally, the 2×2 MMI couplers 233, 243 at the start of one or each of the child Mach-Zehnders 230, 240 may be replaced by more compact 1×2 MMI splitters, but this makes it less convenient to collect a signal that can be directed to MPD's as illustrated in FIG. 2a.

As is illustrated in FIG. 2a, the light phase modulating means comprises four parallel phase modulating electrodes 231b, 232b, 241b, 242b, each arranged to individually apply a respective voltage to a respective primary 231; 241 or secondary 232; 242 waveguide. Moreover, the variable phase modulating electrodes 231b, 232b, 241b, 242b in question are arranged to achieve modulation of the output light by variable phase modulation as a function of said electrical voltage.

According to one preferred embodiment, the modulator 200 comprises respective electrical contacts, for providing said voltage to said respective variable phase shifting means 231b, 232b, 241b, 242b, which contacts are connected to the respective modulating electrodes via respective electrical connectors, wherein at least two, preferably all four, of said connectors cross a plane of reflection associated with the light reflector 260. This is illustrated in FIG. 2a, where the connectors run from the control device 250 to each individual variable electrode affecting the variable phase shift of the respective dynamic phase shifting means 231b, 232b, 241b, 242b.

Figure 3:
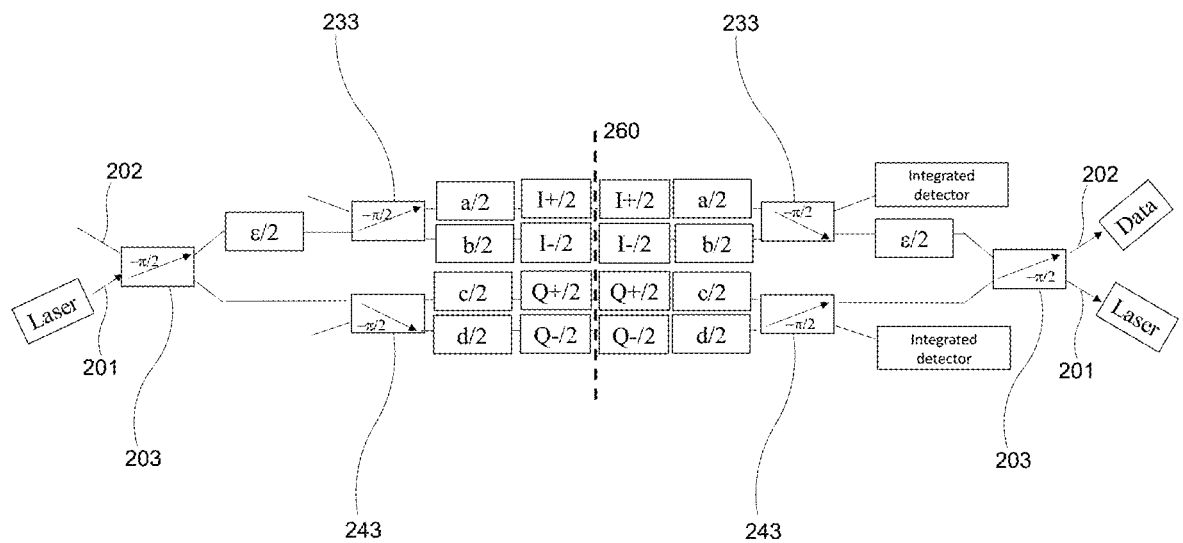

FIG. 3 is an alternative representation of the basic reflective IQ modulator 200 design illustrated in FIG. 2a, but where the device 200 layout has been conceptually "unfolded" about the reflective termination plane 260, such that the optical transmission can be visualized to occur from left to right in the Figure. FIG. 3 shares the same reference numerals with FIG. 2a. In this representation, the $-\pi/2$ relative phase shift (a phase delay, caused by increased optical path length) that occurs for the diagonal path (cross-state) transmission within the 2×2 MMI couplers 233, 243 (relative to propagation to the output port on the non-diagonal, bar-state path) has been included.

In the following Table II, the static phase shift values that are needed to recover the same four point constellation diagram that is given in FIG. 1d are provided.

TABLE II

| Fixed phase shift | Amount |
| --- | --- |
| a | 0 |
| b | 0 |
| c | $+\pi/2$ |
| d | $+\pi/2$ |
| ε | $+\pi$ |

As stated above, FIGS. 1b and 1c show the phasor diagrams for the FIG. 1a configuration. However, FIGS. 1b and 1c are also applicable to FIG. 3, showing the phasor diagrams for the I+, I−, and Q−, Q− modulator arms, in their relative positions when no bias is applied (vectors having a o subscript), and where the curved arrows within the dashed ellipses show how the phasors rotate toward each other in push pull operation, to form either a net positive or negative output vector along the I axis (FIG. 1b) or Q axis (FIG. 1c). It is noted that the scheme used is a push-pull scheme, in the sense that the same relative phase shift I+ is applied in the variable phase shifting means 232b as the relative phase shift I− applied in the means 231b, but with opposite signs, and correspondingly regarding the relative phase shifting means 241b, 242b, applying Q+ and Q−. It is also noted that the light power back to the laser is substantially zero in the absence of applied modulation (the modulator is in the "off" state), and that under active operation the light reflected back to the laser is substantially equal to the amplitude of the data signal that arrives at the output port for this modulator configuration. Each such symbol is defined as a particular combination of I and Q, for instance according to the following scheme:

TABLE III

| Symbol | I+ | I− | Q+ | Q− |
|---|---|---|---|---|
| 1 | 1 | −1 | 1 | −1 |
| 2 | −1 | 1 | 1 | −1 |
| 3 | 1 | −1 | −1 | 1 |
| 4 | −1 | 1 | −1 | 1 |

Some of the key benefits of a folded IQM geometry are that the required dynamic modulation voltage swing amplitudes and/or the interferometer phase arm electrode 231a, 232a, 241a, 242a, 231b, 232b, 241b, 242b lengths can be substantially reduced when compared with a conventional, non-folded, IQ modulator. Furthermore, the magnitude of the applied voltage or current that might be required to set or to fine-tune the fixed phase adjust sections 234, 231a, 232a, 241ba, 242a (sections a, b, c, d, or ε) can also be reduced when compared with the conventional IQM that is illustrated in, for instance, FIG. 1a. The reduced physical dimensions and reduced modulation voltage and/or reduced tuning current amplitudes and/or reduced tuning section lengths together enable a substantial reduction of the folded geometry modulator device fabrication cost, and/or a reduction of the power dissipation during operation.

As shown in FIG. 2a, the reflective plane 260 at one extremity of the modulator 200 provides an opportunity to place RF (Radio Frequency alternating current) or DC (Direct Current) driver circuitry adjacent to this termination plane, in addition to the usual freedoms to place RF or DC drive circuitry along the faces of the modulator 200 that are parallel to the light propagation direction. This is preferred. Alternatively, an optical detector array or other optical apparatus can be situated adjacent to the highly reflective modulator termination plane 260, to monitor the relative phases or amplitudes of the fractions of light that are transmitted from one or more of the interferometer arms 231, 232, 241, 242 through their respective high reflection termination 260. The information collected by such monitors could be utilized for modulator operational configuration, or for source laser channel selection, and/or to monitor transmitter performance over life. Preferably, information measured by such a monitor is provided, in a feedback loop, to the control unit mentioned above, to be used in the control of the modulator 200.

Hence, the modulator 200 is preferably arranged to direct light passing through the reflector 260 to a light detector. The light detector may be arranged externally to the modulator 200, while the reflector 260 of the modulator 200 is arranged to let through a certain proportion, such as between 2% and 10%, preferably about 5%, of the light incident to the reflector 260 from each arm waveguide 231, 232, 241, 242, so that such non-reflected light can enter into and be detected by such an external detector.

Alternatively, the reflector 260 at the end of each arm 231, 232, 241, 242 can be arranged as an integrated grating within each arm 231, 232, 241, 242, and in that case the light detectors can be arranged as one or several integrated parts within the modulator 200 chip itself.

The gratings or high reflectivity facet coatings that are utilized as the reflector 260 can optionally be designed to strongly reflect the carrier wave signals, while permitting substantial (such as at least 50%) transmission at other optical wavelengths, for example to reduce transmitter system noise arising from laser and/or semiconductor optical amplifier spontaneous emissions.

According to a preferred embodiment, respective electrical connectors for providing the voltage to at least the variable phase shifting means 231b, 232b, 241b, 242b are connected to respective modulating electrodes. Such connectors are preferably lumped element electrodes. Herein, the term "lumped element electrode" refers to an electrode having a length that is 15% or less of the electrical wavelength that corresponds to the symbol rate that is delivered by the applied RF signal. Hence, the variable phase electrode 231b, 232b, 241b, 242b length in question has been sufficiently reduced that the parasitic capacitance is diminished to the point that a desired modulation bandwidth will be attainable with lumped element phase electrode construction, rather than a more complex travelling wave electrode construction.

Such lumped element electrodes simplifies the manufacturing process. Any reduction of the dynamic phase modulation electrode 231b, 232b, 241b, 242b length(s) will increase the maximum achievable modulation bandwidth, when compared with a conventional non-folded modulator layout, as a consequence of the reduction in the parasitic capacitance of the phase modulation electrode for the folded modulator layout.

Alternatively, such connectors may be arranged with a transmission line that is impedance matched to a RF driver circuitry providing said voltage.

Figure 4A:
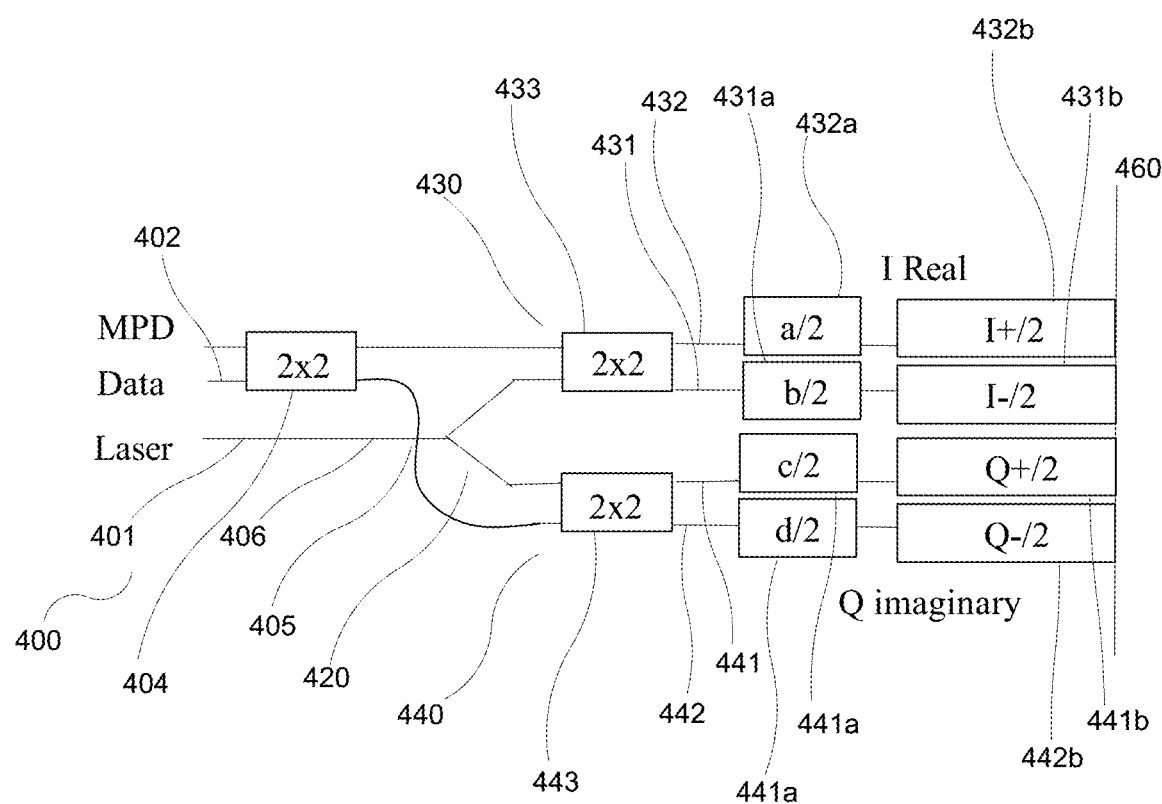
FIG. 4a illustrates a first preferred embodiment of the invention.
Figure 4B:
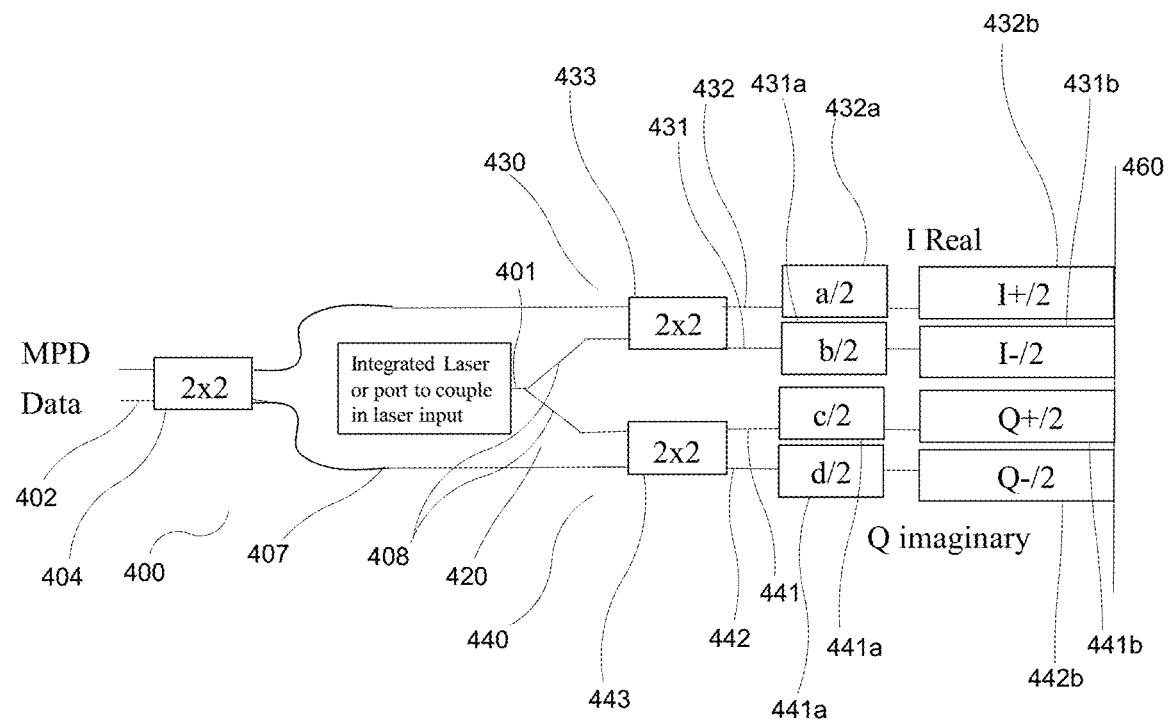
FIG. 4b illustrates a second preferred embodiment of the invention.

As described above, in FIG. 2a, a third MMI coupler 203, in addition to the first 233 and second 243 MMI couplers, is arranged between the main input 201 and the first 233 and second 243 MMI couplers. FIGS. 4a and 4b illustrate two preferred embodiments according to the invention, in which a third MMI coupler 404 is arranged not between a main input 401 and a first 433 and a second 443 MMI coupler, but between a main output 402 and said first 433 and second 443 MMI couplers. It is noted that, while the third MMI coupler 203 of FIG. 2a is arranged between the first 233 and second 243 MMI couplers and both the main input 201 and output 202, the third MMI coupler 404 of FIGS. 4a and 4b is arranged between the first 433 and second 434 MMI couplers and only the main output 402. FIGS. 4a and 4b share the same reference numerals for corresponding parts with FIG. 2a, apart from the first digit in each reference numeral.

In particular, in these preferred examples, the modulator 400 is arranged to convey reflected light exiting the second primary-end access ports of the first 433 and second 443 MMI couplers, respectively, to the main output 402. I other words, the said respective second primary-end access ports of the first 433 and second 443 MMI couplers are connected to the main output 402.

More specifically, in the modulator 400, reflected light exiting the second primary-end access ports of the first 433 and second 443 MMI couplers, respectively, is conveyed to different respective secondary-end access ports of the third MMI coupler 404, which third MMI coupler 404 in turn is arranged to output such reflected light via a first primary-end access port of the third MMI 404 to the main output 402. It is noted that the terms "primary-side" and "secondary-side" are used according to the definitions given above, also for the third MMI coupler 404.

As is shown in FIGS. 4a and 4b, the third MMI coupler 404 preferably also comprises a second primary-end access port. Then, the modulator 400 is arranged to convey reflected light from said second primary-end access port of the third MMI coupler 404 to a light detector MPD comprised in the modulator 400 (such as integrated in the modulator 400), or to provide that light on a separate output port, for provision of that light to an external light detector. The light detected by such an internal or external detector is preferably fed to the above discussed control unit, in a feedback loop, so as to affect the control of the modulator 400.

It is specifically noted that no light is conveyed from the third MMI coupler 404 back to the main input 401. It is of particular importance to note that, unlike the configurations that are illustrated in FIGS. 3 and 2a, the preferred embodiments that are illustrated in FIGS. 4a and 4b can be configured to transmit substantially zero light back to the modulator input port at all of the at least two symbols in the data symbol set used.

FIGS. 4a and 4b illustrate two alternatively preferred layouts of the module 400. In both FIGS. 4a and 4b, the main output 402, the first 433 and second 443 MMI couplers are arranged in one and the same plane.

However, in FIG. 4a, the modulator 400 is arranged to convey reflected light exiting the said respective second primary-end access ports of the first 433 and second 443 MMI couplers to the main output 402, via the third MMI coupler 404, via a waveguide crossing 405 with respect to a waveguide 406 arranged to convey light incident from the main input 401 to the first 433 and second 443 MMI couplers. This makes it simple to arrange also the main input 401 in the same plane as the main output 402 and the first 433 and second 443 MMI couplers. Any path length imbalance between the arms may be adjusted using a separate phase adjustment means (not shown in FIG. 4a) in at least one of the arms, arranged to impart an additional asymmetric (with respect to the two arms in question) phase shift, preferably a static phase shift, so as to configure the two waveguide paths back to the third MMI coupler 404 to balance any optical phase difference between the light that is output from these two paths.

In contrast to FIG. 4a, in FIG. 4b, the modulator 400 is arranged to convey reflected light exiting the said respective second primary-end access ports of the first 433 and second 443 MMI couplers to the main output 402 via a waveguide 407 extending past and around a waveguide 408 arranged to convey light from the main input 401 to the said first primary-end access ports of the first 433 and second 443 MMI couplers. With such a configuration, there is no need for a correction of the nominal physical path length difference between the two arms as described in connection to FIG. 4a.

If a laser source is integrated within the modulator 400 chip, or if the light is coupled vertically into the modulator 400 for example with a surface grating of slanted integrated mirror element to capture input radiation from out of the modulator 400 plane, then one may use a symmetric geometry with equal final combiner 404 arm path lengths. In this case, an additional advantage is that no waveguide crossing is required.

In particular in the example illustrated in FIG. 4b, it is hence preferred that the modulator 400 comprises a semiconductor laser, which is integrated as a part of the same optical chip as the first 433 and second 443 MMI couplers, and arranged to provide light to be modulated to the main input 401. Then, the said laser may be arranged in the same plane as the first 433 and second 443 MMI couplers and between the waveguides arranged to convey light from the second primary-end ports of the first 433 and second 443 MMI couplers to the main output 402. Alternatively, the laser in question may be arranged to supply light to be modulated to a light coupling means ("port to couple in laser input" in FIG. 4b), arranged to direct incident light, not arriving in the same plane as the said waveguides, to the first 433 and second 443 MMI couplers. In this latter case, it is preferred the said coupling means is arranged between a first and a second waveguide arranged to convey light from the respective second primary-end access ports of the first 433 and second 443 MMI couplers to the main output 402, and in particular to the third MMI coupler 404 in case such a third MMI coupler 404 is used. Hence, such light from the laser is then incident at an angle to the paper as shown in FIG. 4b, and redirected by the said redirecting or coupling means so as to be parallel to the paper. It is noted that the redirecting or coupling means is arranged in the same plane as the first 433, second 443 and third 404 MMI coupler in this case.

In general when using an externally arranged laser with the present invention, an isolator may be placed between such an external laser and the corresponding modulator input port, to further diminish the impact on the laser performance of whatever residual reflection returns to the modulator input port, according to the particular modulator configuration and mode of dynamic operation in question.

The embodiment illustrated in FIGS. 4a and 4b, with a third MMI coupler 404 arranged to combine light exiting the second primary-side access ports of the respective first 433 and second 443 MMI couplers, provides particular advantages, in particular in applications where an incomplete phase modulation depth of the I and Q arm voltages is permissible (in other words, where the dynamic voltage swing on the I and Q phase electrodes is less than the voltage required to cause a phase shift having a magnitude of $\pi/2$ on each arm under push pull modulation). In such applications, the length of the variable phase electrode 431b, 432b, 441b, 442b length can be reduced, for example to reduce RF driver power consumption. In the case of incomplete modulation depth, using the example of the four point constellation diagram for the QPSK modulation format, the magnitude of the output signal is reduced, but the relative positions of the four data points are unchanged as compared to the constellation diagram shown in FIG. 1d.

The scenario of incomplete phase modulation depth can facilitate the utilization of the basic reflective IQM modulator 200 geometry illustrated in FIG. 2a, because then the optical signal that is reflected back to the optical input port will have the same time-averaged magnitude as the output data signal. Accordingly, any reduction in the output data signal amplitude will also reduce the level of optical isolation that will be required between the laser source and the modulator 200.

The exemplifying modulators 400 illustrated in FIGS. 4a and 4b, however, are preferred to the configuration shown in FIG. 2a, in particular when the latter is operated with a reduced modulation depth. In the FIGS. 4a and 4b embodiments, the power reflection back to the laser is substantially zero at all QPSK symbols, regardless of the modulation depth, and the worst case reflected power amplitude during the transitions between symbols is substantially lower than for the case of the reflective modulator in FIG. 2a, where the relative advantage over the modulator in FIG. 2a improves as the modulation depth is reduced.

In FIGS. 4a and 4b, a simple Y-branch splitter is used between the main input 401 and the first 433 and second 443 MMI couplers. However, this splitter may also be an MMI coupler, such as a 1×2 or a 2×2 MMI coupler.

Figure 5A:
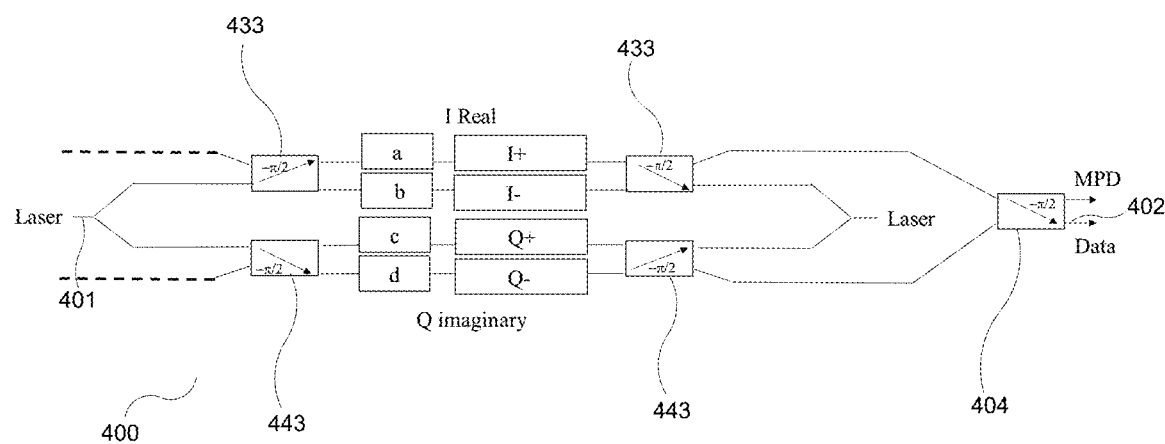
FIG. 5a illustrates an unfolded representation of the folded modulator shown in FIG. 4b.

FIG. 5a shows an "unfolded" representation of FIG. 4b, with optical transmission from left to right, but where the static phase shifting means 431a, 432a, 441a, 442a and the dynamic phase shifting means 431b, 432b, 441b, 442b are represented as the total added phase shift after the double pass (forward and reflected) through each child MZ arm 431, 432, 41, 441, and through each phase adjust section (unlike in FIG. 3a, where the forward and reverse optical travel through the dynamic and static phase modulation sections are represented by separate boxes).

TABLE IV

| Fixed phase shift | Amount |
| --- | --- |
| a | +π/2 |
| b | −π/2 |
| c | +π/2 |
| d | −π/2 |

The phasors I+, I−, Q+, and Q− for the modulator in FIG. 5a add in a manner identical FIGS. 1b and 1c, when the phase shifts that are listed in table IV are utilized in FIG. 5a.

Figure 5B:
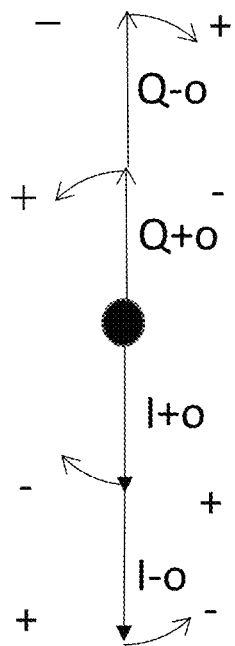

FIG. 5b shows the phasor diagram for the light that is reflected back to the main input port 401, i.e. to the laser, for the same modulation scheme as illustrated in FIGS. 4a-5a, with push pull modulation acting as in 1b-1c, and with the same static phase shifts as presented in Table IV. As is clear from the phasor diagram 5b, the total light reflected back to the laser (the summation of the I and Q vectors from the two child MZ's) is substantially zero, regardless of the push or pull polarity on either child MZ arm pair.

Hence, the configuration according to FIGS. 4a and 4b may achieve a drastic reduction in the time averaged optical reflected signal amplitude back to the laser input port (the main input 401), as compared to the amplitude of the output signal at the data port (the main output 402), as compared with the configuration of FIG. 2a.

For an illustrative QPSK modulation case based on the modulator in FIG. 4, if we designate the absolute magnitude phase modulation depth on each child 430, 440 arm 431, 432, 441, 442 as φ, then in the case of full modulation depth (assuming push-pull modulation as is preferred), φ=π/2, with |φ|<π/2 for the more general case of incomplete modulation depth. Designating the total (static and dynamic) phase modulation on the I arms 431, 432 as A and B, and the Q arms as C and D, and with A=−B, and C=−D for push pull operation, then the net amplitude of the real reflected field is sin A+sin B+sin C+sin D=0, and the net imaginary field amplitude is cos A+cos B−cos C−cos D=0, in other words giving a net field and intensity amplitude of zero at the four data constellation points in question, regardless of the phase modulation depth. By comparison, for a reflective modulator such as that shown in FIG. 2a or 3a, the power reflectance back to the laser at all of the 4 QPSK symbols is the same as the output signal power level for all modulation depths.

Figure 7A:
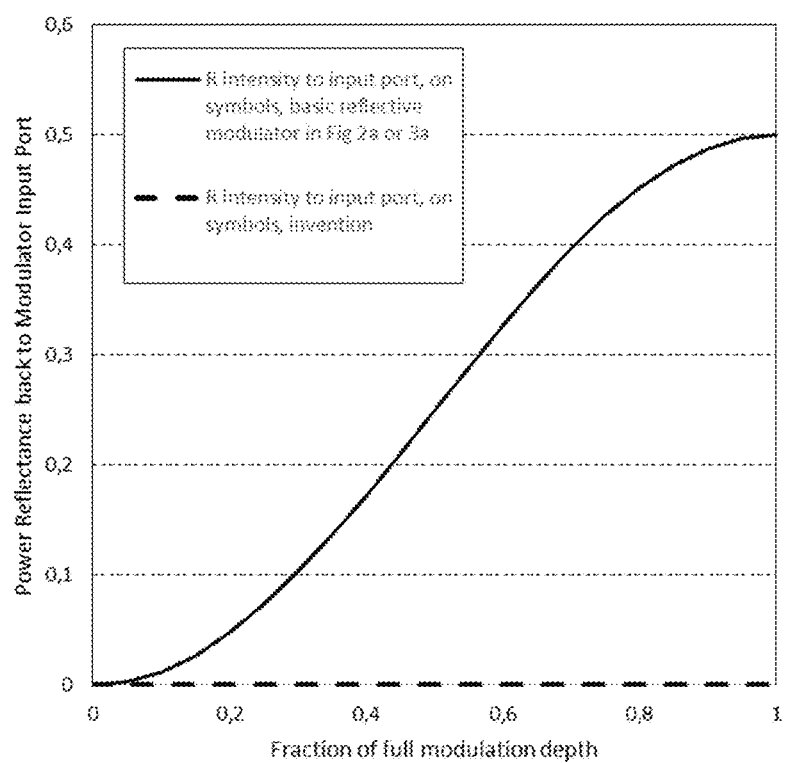
FIGS. 7a and 7b illustrate, in respective graphs, a fraction of a transmitted symbol power that is reflected back to the laser as a function of the modulation voltage depth, for modulators of the types shown in FIGS. 2, 4a, 4b, and 6.

The power reflectance of the reflective modulator embodiments illustrated in FIGS. 2a and 3a, compared to the reflective modulator embodiment of FIG. 4, as a function of the modulation depth, are shown in FIG. 7a.

If we instead quantify the reflection performance as the worst case optical reflection during the transients between symbol transitions for the modulator in FIG. 4, then the result depends on the phase modulation depth φ. For equal power launched into each child Mach Zehnder 430, 440, the power reflectance back to the main input 401 is $$R = \frac{(1-\cos\phi)^2}{4}.$$

Figure 7B:
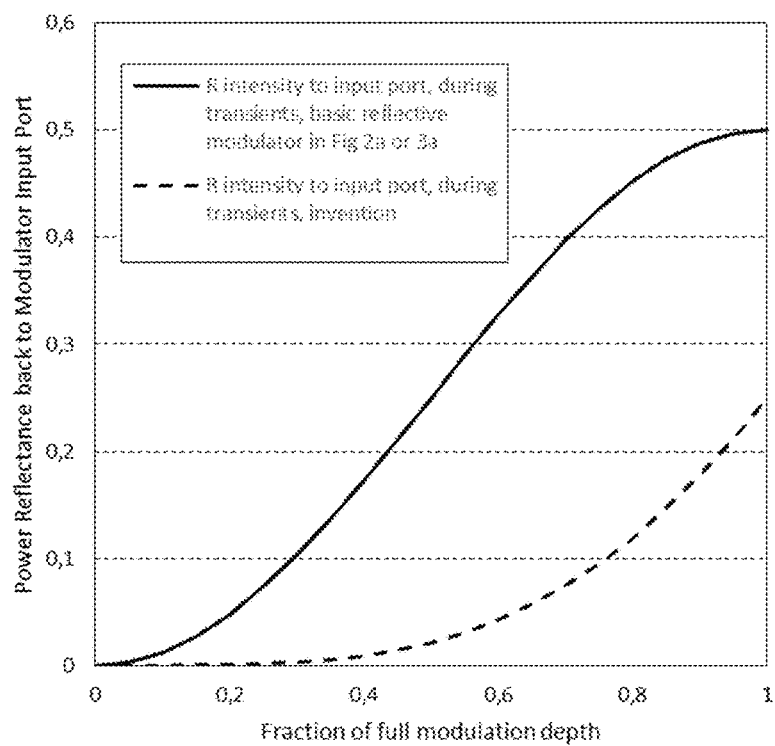

R approaches zero as the phase modulation depth is reduced. The maximum power reflectance level during the transients between transmitted symbols for the FIGS. 2a and 3a embodiments, as well as for the FIG. 4 embodiment, as a function of the modulation depth, are shown in FIG. 7b.

In one aspect, the present invention relates to a modulated light outputting device comprising the laser and an optical interference modulator according to the invention of any of types described herein, or an aggregated optical interference modulator as described below. The control device 250 is arranged to control the optical modulator in question, via a set of applied time-varying control voltages to respective electrodes comprised in the said interference modulator, so as to modulate light output from the laser forming an output modulated optical signal. This has all been described above.

However, in this case it is specifically preferred that the modulated light outputting device in question is such that the modulation is a quadrature phase shift keying or binary phase shift keying modulation. Binary phase shift keying can for example be achieved by modulating between diametrically opposed symbols in a QPSK diagram. Specifically, it is preferred that the modulation in question is performed by applying said control voltages in a push-pull fashion, as explained above, to pairs of control electrodes, wherein each such pair of control electrodes is arranged along a respective pair of primary and secondary waveguides of the above described type.

As mentioned, in one preferred embodiment, full modulation depth is used. However, in an alternatively preferred embodiment, which is particularly useful with the configurations illustrated in FIGS. 4a and 4b, the voltage applied to each electrode results in a relative phase shift of less than π/4 for light passing the electrically affected material once. In other words, the modulation depth is less than full.

Figure 6:
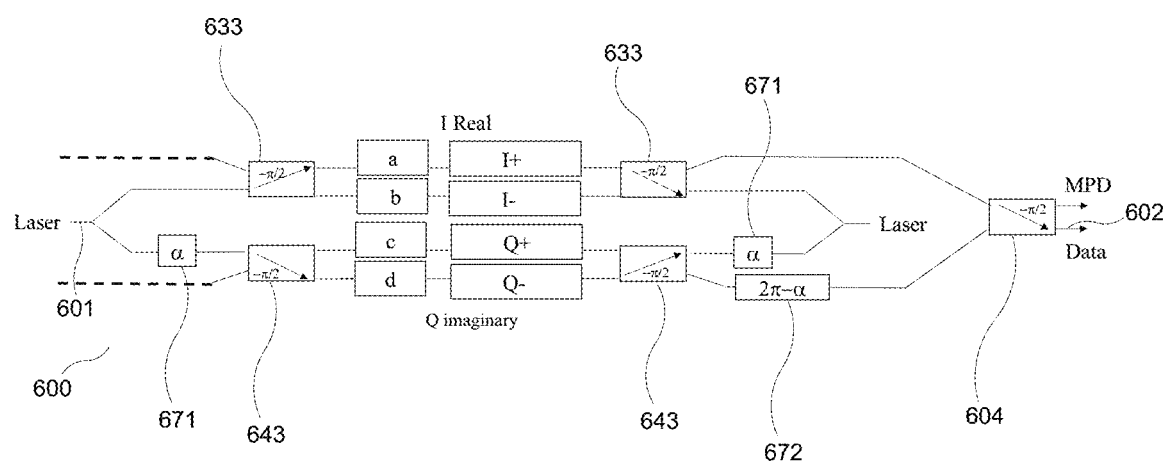
FIG. 6 illustrates a third preferred embodiment of the invention.

FIG. 6 illustrates, in an "unfolded" manner, as in FIG. 5a, another preferred embodiment of the invention in the form of a modulator 600. FIG. 6 shares the same reference numerals with FIGS. 4a-5a for corresponding parts, apart from the first digit in each reference numeral.

As shown in FIG. 6, for at least one of the said first 633 and second 643 MMI couplers, preferably for only one 643 of said MMI couplers 633, 643, an additional static light phase shifting means 671 is arranged between the splitter (the splitter between the main input 601 and the first 633 and second 643 MMI couplers) and the first primary-side access port of the MMI coupler 643 in question. This additional static phase shifting means 671 is arranged to impart a static phase shift of α to light passing through the phase shifting means 671 in question. Furthermore, yet another additional static light phase shifting means 672 is arranged between the second primary-side access port of the same MMI coupler 633 in question and the combining means 604 arranged to combine the light from the second primary-side access port of the MMI coupler 633 in question and the second primary-side access port of the other MMI coupler 643. This other phase shifting means 672 is arranged to impart a phase shift of 2π−α. α is the same for means 671 and 672, and is a constant such that 0≤α<2π.

In general, α may be 0, in which case the configuration illustrated in FIG. 6 simplifies to the one illustrated in FIG. 5a, even not having phase shifting means 671, 672 at all. However, it may also be the case that 0<α<2π. In general in these cases, the value of α is selected so as to minimize the light power reflected back to the main input 601, as a function of voltage modulation depth, for modulation schemes having amplitude and phase modulation output symbol sets where it is in general not possible to get a zero reflection for all symbols in the modulation symbol system in question. In other words, these static phase shifting elements 671 and 672 provide the freedom to minimize the light reflection back to the laser at the symbols or during the transitions between symbols within any particular complex modulation symbol set, in a manner that is completely independent of the phase relationship that must be established between the I and Q vectors when these add at the data output port.

As is clear from FIGS. 7a and 7b, the present invention provides very low reflections back to a main input in a folded geometry for a wide range of applications.

Figure 8A:
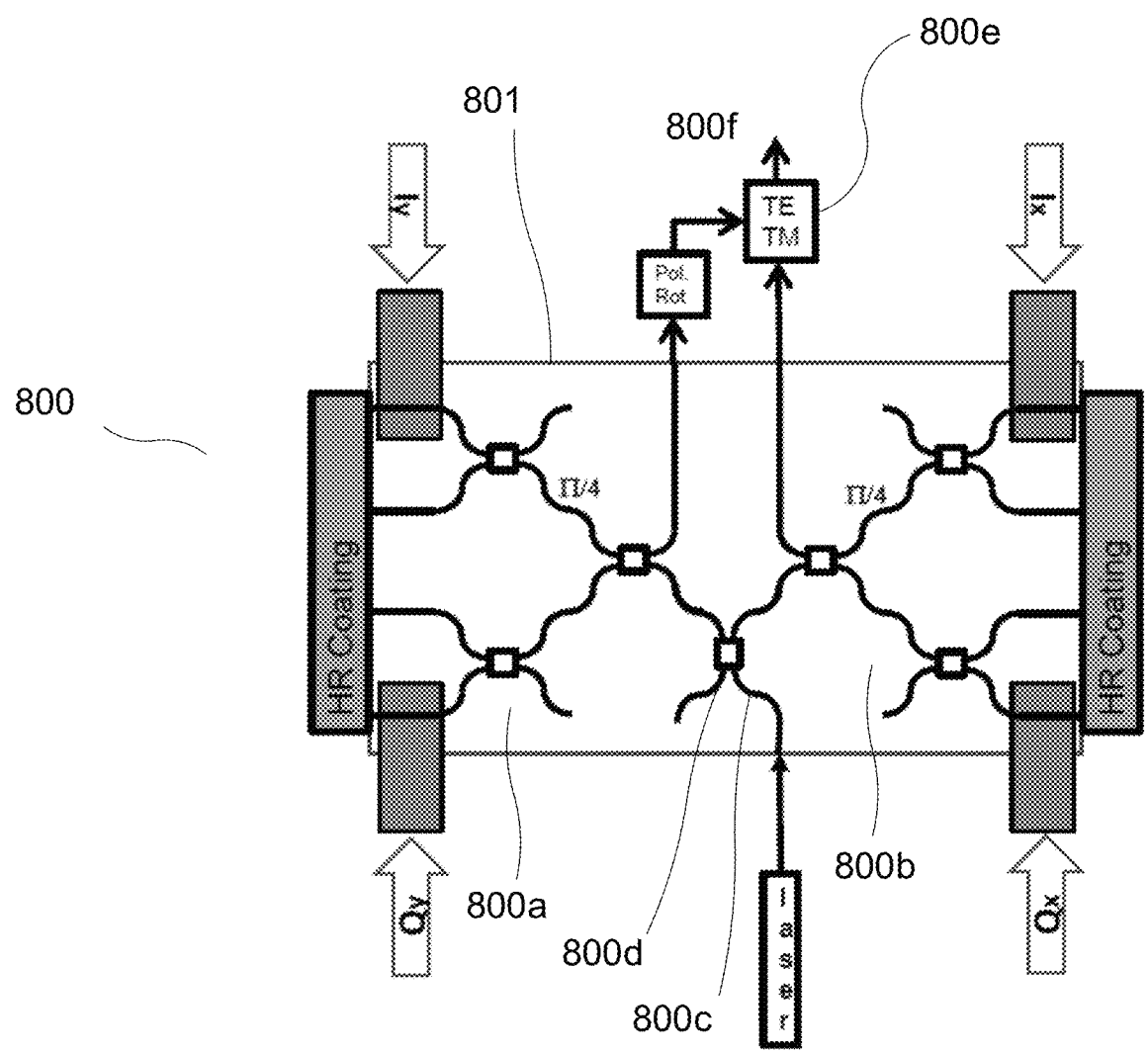
FIG. 8a illustrates a fourth preferred embodiment.
Figure 8B:
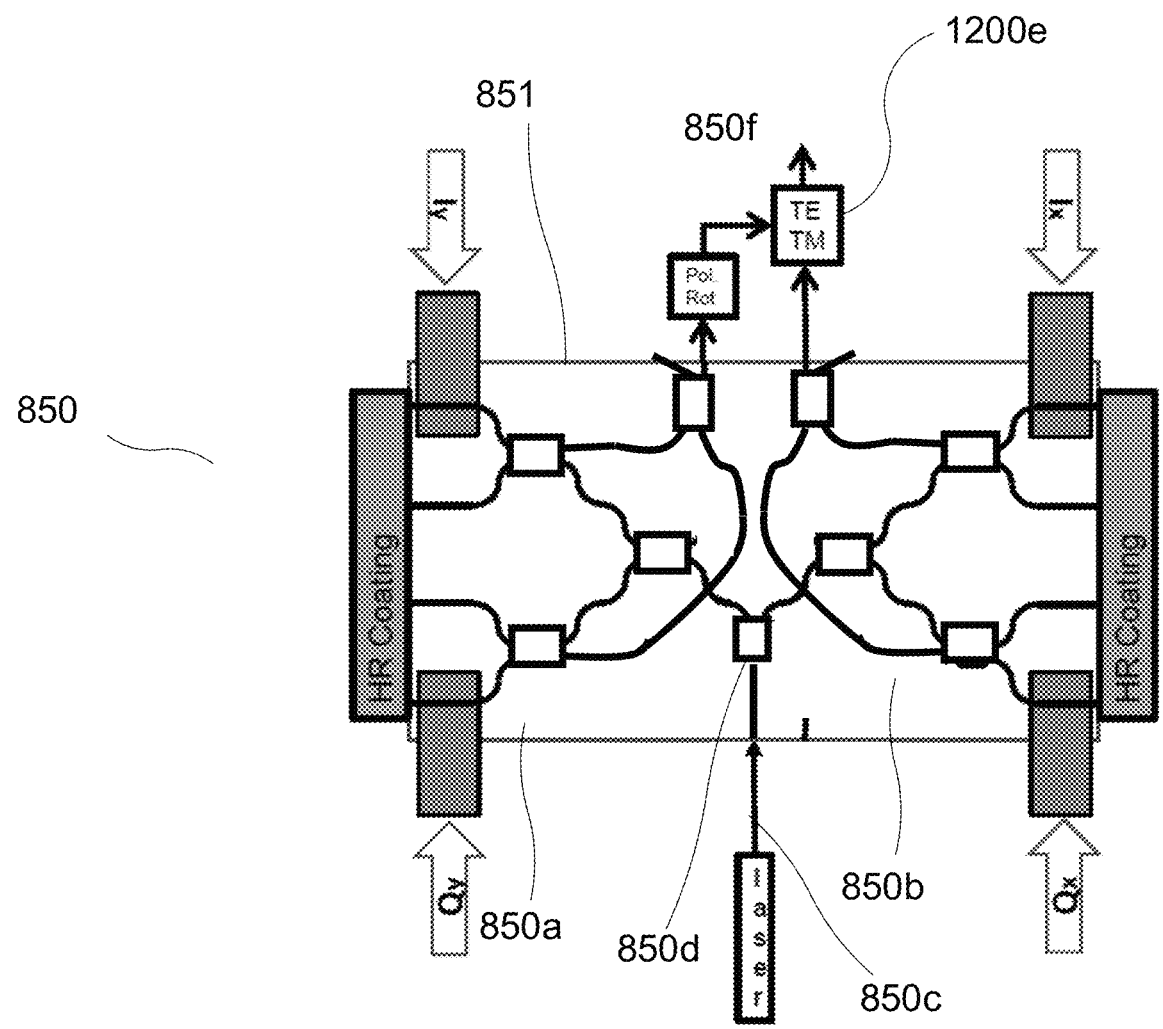
FIG. 8b illustrates a fifth preferred embodiment.

FIGS. 8a and 8b illustrate further preferred embodiments of the present invention, each being an optical interference modulator aggregate 800, 80 comprising a respective combination of two interconnected modulators of the above type. In general, such an aggregate 800, 850 comprises two modulators 800a, 800b; 850a, 850b of the above described type. The aggregated modulator 800, 850 furthermore comprises a main aggregated modulator input 800c; 850c and an optical aggregated modulator light splitter 800d; 850d. The aggregated modulator splitter 800d; 850d is arranged to split light incident from the main aggregated modulator input 800; 850c to each main input of the respective modulators 800a, 800b; 850a, 850b. Preferably, these components 800a, 800b, 800c, 850d; 850a, 850b, 850c, 850d may be arranged as integrated parts on one and the same chip 801; 851.

The light output from the respective main outputs of the two modulators 800a, 800b; 850a, 850b may be handled in different ways. Preferably, the aggregated modulator 800, 850 comprises a main aggregated modulator output 800f; 850f as well as an optical aggregated modulator light combiner 800e; 850e, which aggregated modulator combiner 800e; 850e is arranged to combine light incident from the main outputs of the respective modulators 800a, 800b; 850a, 850b and present such combined light at the said main aggregated modulator output 800f; 850f.

The reflective modulator embodiments described herein harness the advantages of compactness and reduced static and dynamic voltage swings, as described earlier, while also disposing a set of output waveguide paths that do not take the light output signal back to the input port. The disposition of these separate output waveguide paths facilitates the addition of important post modulation functions, such as integrated polarization rotation, and optionally an integrated polarization combiner.

According to a first alternative embodiment, an integrated chip 851; 851 on which the aggregated modulator 800; 850 is arranged comprises two different main outputs, from which output light is fed into off-chip bulk components arranged to provide polarization rotation and polarization combination of the output light so as to produce a combined main output light beam.

According to a second alternative embodiment, the integrated chip 851; 851 on which the aggregated modulator 800; 850 is arranged also comprises two different main outputs, where one or both main outputs is or are arranged with polarization rotation functionality on the chip 801; 851. Polarization rotation may be performed on-chip or off-chip.

According to a third alternative embodiment, the integrated chip 801; 851 on which the aggregated modulator 800; 850 is arranged comprises only one main output, where all of the required polarization rotation and polarization combining are performed on the chip 801; 851 using suitable, integrated optical components.

In both FIGS. 8a and 8b, the respective main input 800c; 850c and main output port 800f; 850f are arranged on opposing sides of the said modulator chip 801; 851. The east and west faces where the respective child MZ arms (of the modulators 800a, 800b; 850a, 850b) terminate have high reflectivity coatings ("HR Coating"), and the main input 800c; 850c and output 800f; 850f ports can be implemented as surface grating couplers. Alternatively, the input 800c; 850c and output 800f; 850f faces may have conventional input and output edge couplers and AR (Anti Reflection) facet coatings, and the east and west reflective child MZ arm terminations might be integrated reflectors, such as gratings or etched TIR (Total Internal Reflection) mirrors.

In FIG. 8a, the modulators 800a, 800b are of the type illustrated in FIG. 2a, while the modulators 850a, 850b of FIG. 8b are of the type illustrated in FIG. 4a. It is realized that such an aggregated modulator can be implemented using any combination of at least two individual modulators according to any one exemplifying embodiment described herein.

In general, the aggregated modulator combiner 800; 850 preferably comprises a polarization rotation means arranged to rotate the phase light incident from one of the modulator 800a, 800b; 850a, 850b main outputs before combining such light with light incident from the other modulator main output 800a, 800b; 850a, 850b to form the light signal output via the main aggregated modulator output 800; 850f.

Figure 9:
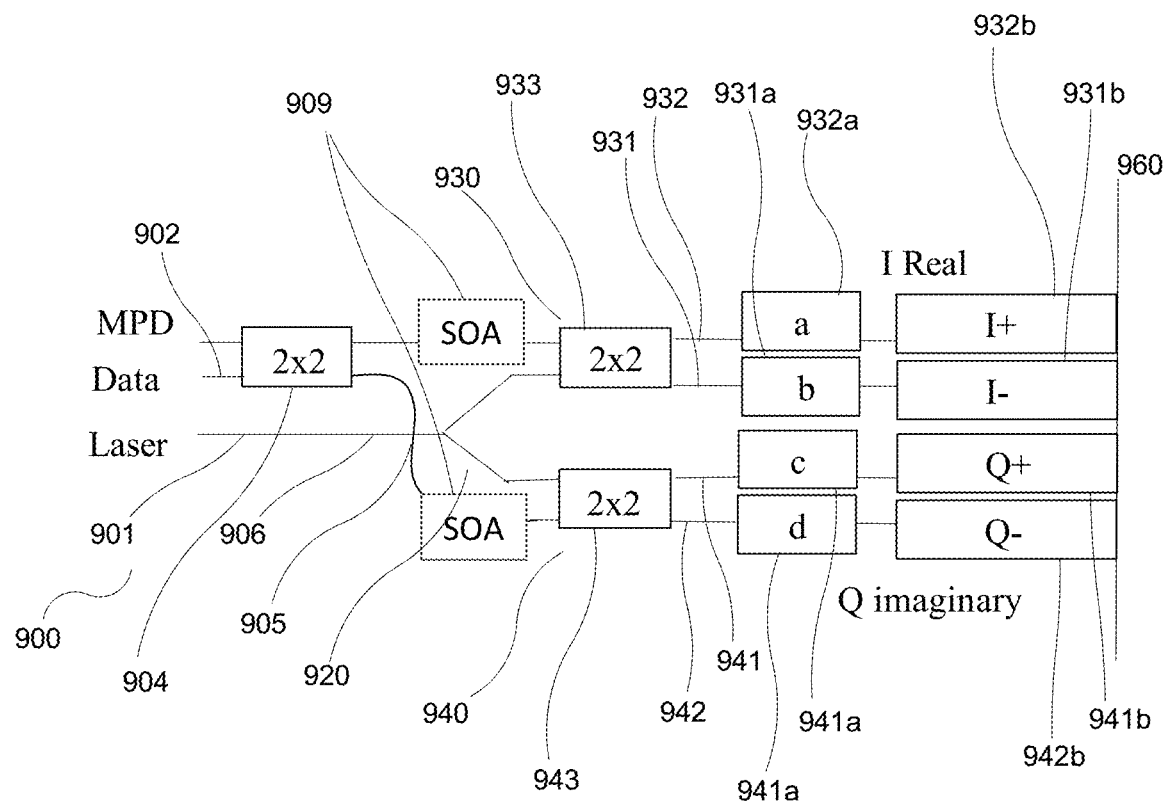
FIG. 9 shows a sixth preferred embodiment of the present invention.

According to one preferred embodiment, which is illustrated in FIG. 9 (sharing reference numerals with FIG. 4a, apart from the initial digits—"9" and "4", respectively—in each reference numeral), the modulator 900 comprises at least one SOA (Semiconductor Optical Amplifier) 909, arranged to amplify reflected light from the first 933 and second 943 MI couplers to the output 902, in particular between the first 933 and second 943 MMI couplers and the third MMI coupler 904 and/or downstream of the third MMI coupler 904.

As seen in FIG. 9, a respective SOA 909 is included on each child MZ 930, 940 output waveguide, to optionally and possibly dynamically controllably boost the respective output signal power during conventional operation, and/or to attenuate the respective output signal under reverse bias of the SOA 909 in question during a reconfiguration of the source laser, such as a change in the lasing wavelength. Preferably, each such SOA 909 is individually connected to, and controlled by, the above described control unit.

According to one preferred alternative, illustrated in FIG. 9, both the respective child MZ 930, 940 output arms are arranged with their own separate SOA 909. According to an alternative embodiment, however, one single SOA can be arranged before the final output 902, after the third and final MMI coupler 904.

In addition to the modulator as such, the invention also relates to a method for controlling such a device, and in particular for modulating an optical signal using an optical interference modulator of the types described herein.

Figure 10:
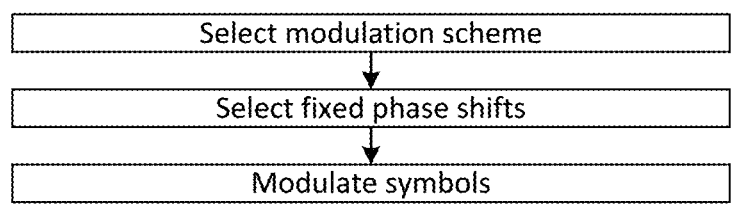
FIG. 10 is a flowchart illustrating a method according to a first method aspect of the invention.

Such a method is illustrated in FIG. 10, and comprises the following steps.

Firstly, a modulation scheme is selected, covering at least two different modulation symbols, and preferably at least four different modulation symbols.

Then, for the light phase modulating device of the present type, respective fixed light phase shifts are selected, using the said phase shifting means along the primary and secondary waveguides of each child MZ as described above, so that destructive interference results for each of said modulated symbols.

Then, modulation takes place of the symbols in said modulation scheme, by selecting different variable light phase shifts for said light phase modulating device along the said primary and secondary waveguides of each child MZ.

It is preferred that the said modulation of said symbols is performed in a push-pull fashion, as described above, using phase shifts I+, I−, Q+ and Q−. In particular, it is preferred that the modulation depth is not complete in this push-pull modulation.

In particular, it is preferred that the said modulation is a phase shift keying or binary phase shift keying modulation scheme.

Moreover, the invention also relates to a method for continuously monitor a modulated optical signal using an optical interference modulator of the type described herein. In particular, this method is useful with modulators of the present type in which reflected light exiting from a particular primary-end MMI coupler access port is conveyed, via a waveguide, to a second output. Such second output detectors are generally denoted "MPD" in the Figures.

Figure 11:
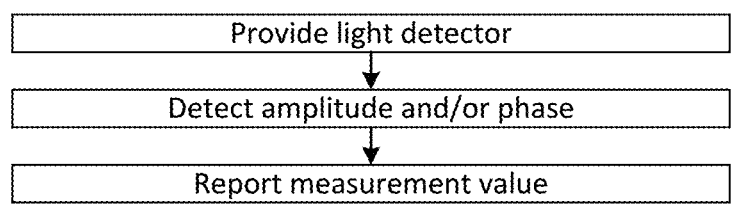
FIG. 11 is a flowchart illustrating a method according to a second method aspect of the invention.

Such method is illustrated in FIG. 11, and comprises the following steps.

Firstly, a light detector is provided, arranged to detect said light conveyed to said second output MPD. This light detector may be an integrated component on the same chip as the modulator in question.

Then, the said light detector MPD is caused to detect an amplitude and/or a phase of the detected light, and to report the measurement value to the control unit, which in turn performs the monitoring.

The continuous monitoring in question is preferably performed in a feedback manner, so that the measurement value report signal from said light detector to the control unit is used, by the control unit, to modulate the phase shifting means of the modulator in question in response to a change in said measured amplitude and/or phase.

Above, preferred embodiments have been described. However, it is apparent to the skilled person that many modifications can be made to the disclosed embodiments without departing from the basic idea of the invention.

A number of detailed examples have been presented. However, the basic principles of the present invention in terms of using MMI couplers as splitters and combiners in a modulator with folded geometry are applicable to a broad spectrum of such modulators. This is also the case for the basic idea of allowing a respective second primary-side access port of such an MMI coupler feed light to a modulator output, while a first primary-side access port feeds light back to a modulator input. For instance, modulators may comprise more, and more complex, sets of components, such as more than two child MZI's, as long as the principles disclosed herein are respected.

In such more complex approaches, asymmetric splitting and combining can, for instance, be used.

In general, everything which is said in relation to one of the said examples is freely applicable to other compatible examples. Hence, the individual aspects of the present invention have been presented in relation to specific examples, but are in general more broadly applicable across various combinations of the presented examples. In particular, many of the detailed features of the solution according to the present invention have been presented in relation to FIG. 2a, and they are, on an individual basis, applicable to the other exemplifying embodiments presented in FIG. 6 and onwards, with one exception being the arrangement of the third MMI coupler.

Modulation schemes useful with the present modulators and methods comprise binary amplitude modulation with a return-top-zero (RZ) or non-return-to-zero (NRZ) optical pulse stream format, and phase shift keying modulation techniques, such as Binary Phase Shift Keying (BPSK) and Quadrature Phase Shift Keying (QPSK), and Quadrature Amplitude Modulation (QAM) techniques, such as QAM8, QAM16 and QAM64. In each of these communication formats, the modulated light wave will carry information about one or several symbols selected among a predetermined set of symbols.

Hence, the invention is not limited to the described embodiments, but can be varied within the scope of the enclosed claims.

What is claimed is:

1. Optical interference modulator, comprising
a main input for light to be modulated,
a main output for modulated light,
an optical splitter connected to the main input,
respective first and second MMI (MultiMode Interference) couplers, each with
a respective first primary-end access port connected to the splitter;
a respective second primary-end access port connected to the main output;
a respective first secondary-end access port connected to a respective primary waveguide; and
a respective second secondary-end access port connected to a respective secondary waveguide,
wherein the modulator further comprises a light reflector arranged to reflect light incident from said primary and secondary waveguides back into the same respective waveguide, so that light travelling through the waveguide in question from said respective first or second MMI coupler secondary-end access port will, after reflection, travel back to the same first or second MMI coupler secondary-end access port,
wherein, for both the first and second MMI couplers, at least one of the said respective primary and secondary waveguides comprises a respective light phase modulating device arranged to modulate the phase of light travelling along the waveguide in question in both directions; and
wherein both the first and second MMI couplers are arranged so that a different respective phase shift is imparted to light travelling between a primary-end access port and a secondary-end access port in a cross state as compared to in a bar state.

2. Optical interference modulator according to claim 1, wherein, for each MMI coupler, at least one of said respective primary and secondary waveguides comprises a respective fixed phase shift device, the combination of fixed phase shift devices being selected so that destructive interference results between light exiting the respective first primary-end access ports of each MMI coupler and being combined in the said splitter, at least when the said phase modulating device is set so as to modulate the light output through the output waveguide according to at least two different predetermined modulation symbols.

3. Optical interference modulator according to claim 1, wherein, for at least one MMI coupler, a light phase shifting device is arranged between the splitter and the first primary-side access port and arranged to impart a phase shift of $\alpha$, and another light phase shifting device arranged between the second primary-side access port and a combining device arranged to combine the light from the second primary-side access port and the second primary-side access port of the other MMI coupler and arranged to impart a phase shift of $2\pi-\alpha$, where $\alpha$ is a constant such that $0 \le \alpha < 2\pi$.

4. Optical interference modulator according to claim 1, wherein the modulator is a Mach-Zehnder modulator, and wherein each of the said first and second MMI couplers are arranged to split light incident from the main input into different respective waveguides and also to combine reflected light incident from such different waveguides.

5. Optical interference modulator according to claim 4, wherein the first MMI coupler forms both the splitter and combiner of a first optical interferometer arranged to control the real part of the electromagnetic field of the light to be modulated, wherein the second MIMI coupler forms both the splitter and combiner of a second optical interferometer arranged to control the imaginary part of the electromagnetic field of the light to be modulated.

6. Optical interference modulator according to claim 1, wherein the first and second MIMI couplers are arranged to impart a relative phase shift of $\pi/2$ between cross state transmitted light passing the MMI coupler in question and bar state light passing the MMI coupler in question, respectively.

7. Optical interference modulator according to claim 1, wherein the modulator is arranged to convey reflected light exiting said second primary-end access ports to different respective secondary-end access ports of a third MIMI coupler, which third MMI coupler is arranged to output such reflected light via a first primary-end access port of the third MMI to the main output.

8. Optical interference modulator according to claim 7, wherein the modulator comprises at least one SOA (Semiconductor Optical Amplifier), arranged to amplify reflected light from the first and second MMI couplers to the third MMI coupler and/or downstream of the third MMI coupler.

9. Optical interference modulator according to claim 8, wherein said third MMI coupler also comprises a second primary-end access port, and wherein the modulator is arranged to convey reflected light from said second primary-end access port of the third MMI coupler to a light detector comprised in the modulator, or to provide that light on an output port.

10. Optical interference modulator according to claim 1, wherein the modulator is arranged to direct light passing through the reflector to a light detector.

11. Optical interference modulator according to claim 1, wherein the main input, the main output, the first and second MMI couplers are arranged in one and the same plane, and wherein the modulator is arranged to convey reflected light exiting the said respective second primary-end access ports of the first and second MMI couplers to the main output via a waveguide crossing with respect to a waveguide arranged to convey light incident from the main input to the first and second MMI couplers.

12. Optical interference modulator according to claim 1, wherein the main output, the first and second MMI couplers are arranged in one and the same plane, and wherein the modulator is arranged to convey reflected light exiting the said respective second primary-end access ports of the first and second MMI couplers to the main output via a waveguide extending past and around a waveguide arranged to convey light from the main input to the said first primary-end access ports.

13. Optical interference modulator according to claim 12, wherein the modulator comprises a semiconductor laser, which is integrated as a part of the same optical chip as the first and second MMI couplers and arranged to provide light to be modulated to the main input, and wherein the said laser is arranged in the same plane as the first and second MMI couplers and between said waveguides arranged to convey light from the second primary-end ports to the main output, alternatively that the laser is arranged to supply light to be modulated to a light coupling device arranged to direct incident light, not arriving in the same plane as the said waveguides, to the first and second MIMI couplers, and that the said coupling device is arranged between a first and a second waveguide arranged to convey light from the respective second primary-end access ports to the main output.

14. Optical interference modulator according to claim 1, wherein the light reflector is a cleaved facet of an integrated optical chip comprising the first and second MMI couplers, provided with a high reflectivity coating, or where the arms terminate with a grating reflector or a TIR type reflector, or with an etched, non-cleaved facet that is then coated with a high reflectivity coating.

15. Optical interference modulator according to claim 1, wherein the light phase modulating device comprises four parallel phase modulating electrodes, each arranged to individually apply a respective voltage to a respective primary or secondary waveguide, which phase modulating electrodes are arranged to achieve modulation of the output light by variable phase modulation as a function of said electrical voltage.

16. Optical interference modulator according to claim 15, wherein respective electrical contacts for providing said voltage are connected to the respective modulating electrodes via respective electrical connectors, wherein at least two of said connectors cross a plane of reflection associated with the light reflector.

17. Optical interference modulator according to claim 15, wherein respective electrical connectors for providing said voltage are connected to the respective modulating electrodes, which connectors are lumped element electrodes, alternatively that the connectors are arranged with a transmission line that is impedance matched to a RF driver circuitry providing said voltage.

18. Aggregated optical interference modulator comprising two modulators according to claim 1, wherein the aggregated modulator comprising a main aggregated modulator input, a main aggregated modulator light combiner, which aggregated modulator light splitter and an optical aggregated modulator light combiner, which aggregated modulator splitter is arranged to split light incident from said main aggregated modulator input to each main input of the respective modulators, and which aggregated modulator combiner is arranged to combine light incident from the main outputs of the respective modulators.

19. Aggregated optical interference modulator according to claim 18, wherein the said aggregated modulator combiner comprises a polarization rotation device arranged to rotate the polarization of the phase light that is incident from at least one of the modulator main outputs before combining such light with light incident from the other modulator main output to form the light signal output via the main aggregated modulator output, or where the combining of the two dissimilar polarizations is done off the chip.

20. Modulated light outputting device comprising a laser and an optical interference modulator according to claim 1, wherein the control device is arranged to control the optical modulator, via a set of applied time-varying control voltages to respective electrodes comprised in the said interference modulator, so as to modulate light output from the laser forming an output modulated optical signal.

21. Modulated light outputting device according to claim 20, wherein the modulation is a phase shift keying or binary phase shift keying modulation.

22. Modulated light outputting device according to claim 21, wherein the modulation is performed by applying said control voltages in a push-pull fashion to pairs of control electrodes, wherein each such pair of control electrodes is arranged along a respective pair of primary and secondary waveguides.

23. Modulated light outputting device according to claim 22, wherein the voltage applied to each electrode results in a relative phase shift of less than $\pi/4$ for light passing the electrically affected material once.

24. Method for modulating an optical signal using an optical interference modulator, which optical interference modulator comprises
    a main input for light to be modulated,
    a main output for modulated light,
    an optical splitter connected to the main input,
    respective first and second MMI (MultiMode Interference) couplers, each with
        a respective first primary-end access port connected to the splitter;
        a respective second primary-end access port connected to the main output;
        a respective first secondary-end access port connected to a respective primary waveguide; and
        a respective second secondary-end access port connected to a respective secondary waveguide,
wherein the modulator further comprises a light reflector arranged to reflect light incident from said primary and secondary waveguides back into the same respective waveguide, so that light travelling through the waveguide in question from said respective first or second MMI coupler secondary-end access port will, after reflection, travel back to the same first or second MMI coupler secondary-end access port,
wherein, for both the first and second MMI couplers, at least one of the said respective primary and secondary waveguides comprises a respective light phase modulating device arranged to modulate the phase of light travelling along the waveguide in question in both directions; and
wherein both the first and second MMI couplers are arranged so that a different respective phase shift is imparted to light travelling between a primary-end access port and a secondary-end access port in a cross state as compared to in a bar state,
which method comprises the steps of
    a) selecting a modulation scheme covering at least two different modulation symbols;
    b) for the said light phase modulating device along the said primary and secondary waveguides, selecting respective fixed light phase shifts so that destructive interference results for each of said modulated symbols, and
    c) modulating the said symbols by selecting different variable light phase shifts for said light phase modulating device along the said primary and secondary waveguides.

25. Method according to claim 24, wherein the said modulation of said symbols is performed in a push-pull fashion wherein the modulation depth is not complete.

26. Method according to claim 25, wherein the said modulation is a phase shift keying or binary phase shift keying modulation.

* * * * *